US011551295B2

United States Patent
Studnitzer et al.

(10) Patent No.: US 11,551,295 B2
(45) Date of Patent: Jan. 10, 2023

(54) EXECUTION OF CO-DEPENDENT TRANSACTIONS IN A TRANSACTION PROCESSING SYSTEM

(71) Applicant: Chicago Mercantile Exchange Inc., Chicago, IL (US)

(72) Inventors: Ari Studnitzer, Northbrook, IL (US); Pearce Peck-Walden, Chicago, IL (US); Mark Rogerson, London (GB)

(73) Assignee: Chicago Mercantile Exchange Inc., Chicago, IL (US)

( * ) Notice: Subject to any disclaimer, the term of this patent is extended or adjusted under 35 U.S.C. 154(b) by 596 days.

(21) Appl. No.: 15/392,618

(22) Filed: Dec. 28, 2016

(65) Prior Publication Data
US 2017/0193602 A1 Jul. 6, 2017

Related U.S. Application Data

(60) Provisional application No. 62/272,847, filed on Dec. 30, 2015.

(51) Int. Cl.
*G06Q 40/04* (2012.01)
(52) U.S. Cl.
CPC .................... *G06Q 40/04* (2013.01)
(58) Field of Classification Search
CPC .................................................. G06Q 40/04
See application file for complete search history.

(56) References Cited

U.S. PATENT DOCUMENTS

| | | | |
|---|---|---|---|
| 6,278,982 B1 | 8/2001 | Korhammer et al. | |
| 7,127,422 B1 | 10/2006 | Bundy | |
| 7,412,415 B2 | 8/2008 | Waddell | |
| 7,461,026 B2 | 12/2008 | Schluetter | |
| 7,756,782 B2 | 7/2010 | Monroe et al. | |
| 7,904,371 B2 | 3/2011 | Davidowitz et al. | |
| 8,195,557 B2 * | 6/2012 | Adcock .................. | G06Q 30/06 705/37 |
| 8,484,121 B2 | 7/2013 | Balabon | |
| 8,489,747 B2 | 7/2013 | Aisen et al. | |
| 9,280,791 B2 | 3/2016 | Rooney | |
| 9,652,803 B2 * | 5/2017 | Lane ...................... | G06Q 40/04 |
| 10,096,066 B2 * | 10/2018 | Lane ...................... | G06Q 40/04 |
| 10,296,975 B2 * | 5/2019 | Lane ...................... | G06Q 40/04 |
| 10,354,338 B2 * | 7/2019 | Co .......................... | G06Q 40/04 |

(Continued)

OTHER PUBLICATIONS

Wikipedia, "Data Buffer," Oct. 26, 2015, <https://en.wikipedia.org/w/index.php?title=Data_buffer&oldid=687561953> (Year: 2015).*

(Continued)

*Primary Examiner* — Kenneth Bartley
(74) *Attorney, Agent, or Firm* — Lempia Summerfield Katz LLC

(57) ABSTRACT

Systems and methods are disclosed for ensuring execution of multiple inter-dependent transactions in an electronic data transaction processing system in which a plurality of data items are transacted by one or more hardware matching processors associated therewith that match a combined electronic data transaction request comprising a conditional execution instruction and a plurality of component electronic data transaction request messages, each for transaction of a different data item of the plurality of data items.

16 Claims, 8 Drawing Sheets

(56) References Cited

U.S. PATENT DOCUMENTS

| | | | |
|---|---|---|---|
| 2002/0013753 A1* | 1/2002 | Marks de Chabris | G06Q 40/00 705/36 R |
| 2004/0267655 A1* | 12/2004 | Davidowitz | G06Q 40/00 705/37 |
| 2005/0125329 A1* | 6/2005 | Gerhart | G06Q 40/04 705/37 |
| 2008/0133891 A1* | 6/2008 | Saiz | G06F 8/30 712/220 |
| 2009/0089071 A1* | 4/2009 | Doornebos | G06Q 20/12 705/342 |
| 2011/0087579 A1* | 4/2011 | Milne | G06Q 40/04 705/37 |
| 2011/0093378 A1* | 4/2011 | Lane | G06Q 40/04 705/37 |
| 2011/0093379 A1* | 4/2011 | Lane | G06Q 40/04 705/37 |
| 2012/0041894 A1 | 2/2012 | Glodjo et al. | |
| 2013/0218747 A1* | 8/2013 | Abrams | G06Q 40/04 705/37 |
| 2014/0040112 A1* | 2/2014 | Bergenudd | G06Q 40/04 705/38 |
| 2014/0337198 A1* | 11/2014 | Abrams | G06Q 40/04 705/37 |
| 2015/0127510 A1 | 5/2015 | Studnitzer et al. | |
| 2015/0127520 A1* | 5/2015 | Farnstrom | G06Q 40/04 705/37 |
| 2015/0262297 A1 | 9/2015 | Callaway et al. | |
| 2015/0309790 A1* | 10/2015 | Henriksen | G06F 8/77 717/121 |
| 2017/0004563 A1* | 1/2017 | Noviello | G06Q 40/04 |
| 2017/0124651 A1* | 5/2017 | Abrams | G06Q 40/04 |
| 2017/0186087 A1* | 6/2017 | Lane | G06Q 40/04 |
| 2017/0193602 A1* | 7/2017 | Studnitzer | G06Q 40/04 |
| 2019/0012738 A1* | 1/2019 | Lane | G06Q 40/04 |
| 2019/0236703 A1* | 8/2019 | Lane | G06Q 40/04 |

OTHER PUBLICATIONS

International Search Report and Written Opinion, from PCT/US2016/068826, dated Mar. 30, 2017, WO.

Rama Cont et al., "Optimal Order Placement in Limit Order Markets", Oct. 2012, 39 pages.

Extended European Search Report, from EP 16826640, dated Dec. 22, 2020, EP.

* cited by examiner

EXECUTION OF CO-DEPENDENT TRANSACTIONS IN A TRANSACTION PROCESSING SYSTEM

RELATED APPLICATIONS

This application claims the benefit of the filing date under 35 U.S.C. § 119(e) of Provisional U.S. Patent application Ser. No. 62/272,847, filed on Dec. 30, 2015, which is hereby incorporated by reference in its entirety.

BACKGROUND

Computer processing speeds depend in large part on the amount of data being processed and the complexity of the operations and processing being performed on the data. Reducing or minimizing the number of data sets and/or operations performed thereon can increase processing efficiency. One exemplary environment where optimizing computer processing is desirable is in financial markets, and in particular, electronic financial exchanges, such as a futures exchange, such as the Chicago Mercantile Exchange Inc. (CME).

A financial instrument trading system, such as a futures exchange, such as the Chicago Mercantile Exchange Inc. (CME), provides a contract market where financial instruments, e.g., futures and options on futures, are traded using electronic systems. "Futures" is a term used to designate all contracts for the purchase or sale of financial instruments or physical commodities for future delivery or cash settlement on a commodity futures exchange. A futures contract is a legally binding agreement to buy or sell a commodity at a specified price at a predetermined future time. An option contract is the right, but not the obligation, to sell or buy the underlying instrument (in this case, a futures contract) at a specified price within a specified time. The commodity to be delivered in fulfillment of the contract, or alternatively the commodity for which the cash market price shall determine the final settlement price of the futures contract, is known as the contract's underlying reference or "underlier." The terms and conditions of each futures contract are standardized as to the specification of the contract's underlying reference commodity, the quality of such commodity, quantity, delivery date, and means of contract settlement. Cash settlement is a method of settling a futures contract whereby the parties effect final settlement when the contract expires by paying/receiving the loss/gain related to the contract in cash, rather than by effecting physical sale and purchase of the underlying reference commodity at a price determined by the futures contract, price. Options and futures may be based on more generalized market indicators, such as stock indices, interest rates, futures contracts and other derivatives.

An exchange may provide for a centralized "clearing house" through which trades made must be confirmed, matched, and settled each day until offset or delivered. The clearing house may be an adjunct to an exchange, and may be an operating division of an exchange, that is responsible for settling trading accounts, clearing trades, collecting and maintaining performance bond funds, regulating delivery, and reporting trading data. One of the roles of the clearing house is to mitigate credit risk. Clearing is the procedure through which the clearing house becomes buyer to each seller of a futures contract, and seller to each buyer, also referred to as a novation, and assumes responsibility for protecting buyers and sellers from financial loss due to breach of contract, by assuring performance on each contract. A clearing member is a firm qualified to clear trades through the clearing house.

The clearing house of an exchange clears, settles and guarantees matched transactions in contracts occurring through the facilities of the exchange. In addition, the clearing house establishes and monitors financial requirements for clearing members and conveys certain clearing privileges in conjunction with the relevant exchange markets.

Traders trading on an exchange often desire to trade multiple financial instruments in combination. Each component of the combination may be referred to as a leg. Traders may submit orders for individual legs or in some cases may submit a single order for multiple financial instruments in an exchange-defined combination or a trader-defined combination. Such orders may be called a combination order, a strategy order, a spread order, or a variety of other names.

Legging risk is the risk of not being able to fulfill a particular leg of a combination order (two or more related orders) at the price desired. This may occur when the trader is not trading an exchange-offered strategy such as a spread order, i.e. a single product offered for trading by the exchange that comprises multiple component products, but has determined a combination composed of legs that are individually tradable instruments in a market or across markets. The trader may attempt to trade all of the combination's legs at the same time by submitting individual transaction requests therefore. However, as each transaction is individually processed by the Exchange along with transactions received from other traders that may be competing for the same opportunities, as soon there is a significant possibility that one or more of the trader's transactions will not be transacted as expected. If less than all of the leg transactions are traded, the trader is exposed to legging risk, i.e. the risk that overall goal, e.g. a particular hedge position, of the combination of the transactions will not be achieved. If the price at which a leg is executed is different from what the trader expected or if a leg fails to trade because an expected resting offer has been filled by another order, the desired risk of the overall position the trader was trying to achieve, as it was calculated, may no longer be valid, and the trader is "legged out". This may not only eliminate any benefit, but also leave the trader with an adverse position.

DETAILED DESCRIPTION

Figure 1:
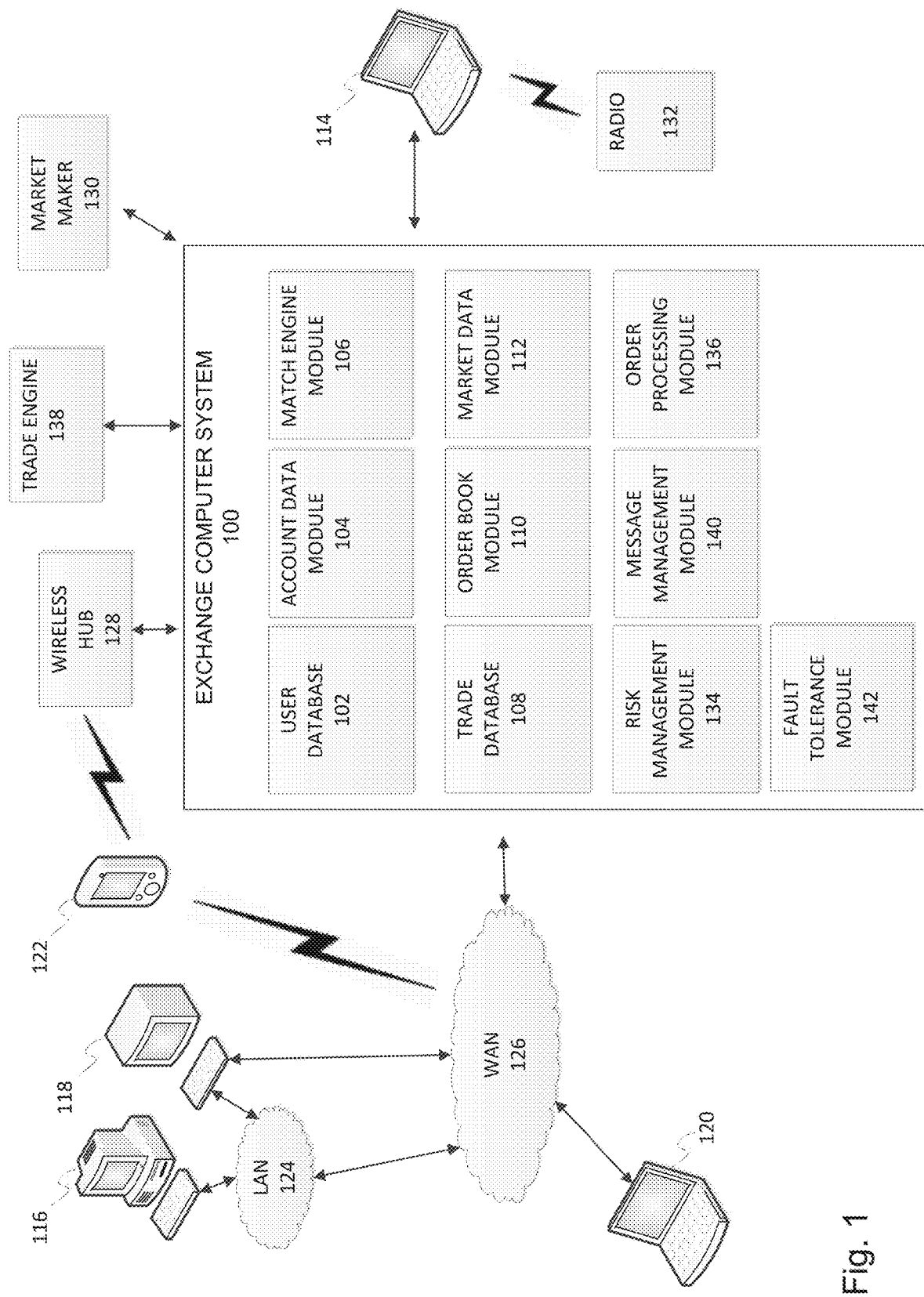
FIG. 1 depicts an illustrative computer network system that may be used to implement aspects of the disclosed embodiments.

The disclosed embodiments relate generally to matching orders in an order book. A request (referred to as a conditional mass order) may be received that includes multiple orders and a conditional execution instruction. The conditional execution instruction may require, for example, that the multiple orders included in the request should only be executed if the multiple orders will all be completely satisfied based on the current status of the relevant order books, otherwise the order should be rejected. This requirement allows a trader to determine their own combination of orders and submit the combination of orders to the exchange without the risk that some of the orders will, and some will not, be executed. If the conditional execution instruction has been determined to be satisfied, a match engine may match the orders with one or more resting, i.e. previously received but unsatisfied, orders.

The conditional mass order may be useful in many different scenarios where a trader wishes to have multiple orders automatically executed according to specified conditions, such as all of the orders being filled entirely (or at a specified minimum quantity) or none at all. For example a conditional mass order may allow a trader create transactions, i.e. trading strategies (combinations of transactions which achieve a desired result) which result in a desired hedge or risk positions, which only trade if particular prices and/or quantities of different products may be obtained, or which result in implied matches, as will be described in more detail below, and may allow traders to utilize any degree of implication complexity, independent of what the exchange implemented at the matching engine, without fear of orders not being executed. In the case of utilizing conditional mass orders to achieve an implied result, the conditional mass order may allow for increased implication complexity done outside the match engine without increasing the computational load on a match engine. With increased implication, the conditional mass order may also allow for, as well as increase, transactional opportunities and improved accessibility of separate liquidity pools that increases the value of the exchange for end-users.

In the context of foreign currency swaps, referred to as Spot FX, the disclosed embodiments may allow a trader to submit a combination of a US Dollar/British Pounds (USD/GBP) swap and a British Pound/Euro (GBP/EUR) swap to achieve an equivalent of a Euro/US Dollar position (EUR/USD) via implication.

An Exchange may offer tradeable products that implement a trading strategy via a singular transaction/transactable product that includes a combination of individual orders (legs). Additionally, trading strategies that are not offered by an exchange as a tradeable product may nevertheless be generated by submitting combinations of orders using trading software. Both exchange offered and trading software generated trading strategies may include multiple products across multiple order books.

Each order book for a product may be referred to as a market for the product. Electronic trading of financial instruments, such as futures contracts, is conducted by market participants sending orders, such as to buy or sell one or more futures contracts, in electronic form, e.g. electronic data transaction request messages, to the Exchange. These electronically submitted orders to buy and sell are then matched, if possible, by the Exchange, i.e. by the Exchange's match engine, to execute a trade. Outstanding (unmatched, wholly unsatisfied/unfilled or partially satisfied/filled) orders are maintained in one or more memories or other storage devices, such as in one or more data structures or databases stored therein referred to as "order books," such orders being referred to as "resting," and made visible, i.e., their availability for trading is advertised, to the market participants through electronic notifications/broadcasts, referred to as market data feeds. An order book is typically maintained for each product, e.g. instrument, traded on the electronic trading system and generally defines or otherwise represents the state of the market for that product, i.e. the current prices at which the market participants are willing buy or sell that product. Order books may constantly be changing as orders arrive and are either matched and filled, or unmatched and added to the order book, or are otherwise modified or canceled.

In derivative markets, liquidity may be naturally fragmented across multiple related markets. End-users of that liquidity may not be technically savvy enough to access multiple order books at the same point in time. That leaves room for more technologically savvy participants to act on expected micro shocks in liquidity demand, reducing the liquidity available to end-users. An Exchange may address this concern by automatically aggregating the separate pools of liquidity, referred to as "implication".

Implication is where a given order for a financial instrument may be matched via a combination of suitable counter orders for financial instruments that share common, or otherwise interdependent, component financial instruments. While each financial instrument may have its own order book, i.e. market, in which it may be traded, in the case of a financial instrument having more than one component financial instrument, those component financial instruments may further have their own order books in which the component financial instruments may be traded. Accordingly, when an order for a financial instrument is received, it may be matched against a suitable counter order in its own order book or, possibly, against a combination of suitable counter orders in the order books the component financial instruments thereof, or that share a common component financial instrument.

The order for a particular financial instrument actually received from a market participant, whether it comprises one or more component financial instruments, is referred to as a "real" or "outright" order, or simply as an outright. The one or more orders that must be synthesized into order books other than the order book for the outright order in order to create matches therein, are referred to as "implied" orders. Upon receipt of an incoming order, the identification or derivation of suitable implied orders that would allow at least a partial trade of the incoming outright order to be executed is referred to as "implied matching", the identified orders being referred to as an "implied match." Depending on the number of component financial instruments involved, and whether those component financial instruments further comprise component financial instruments of their own, there may be numerous different/alternative implied matches identified that would allow the incoming order to be at least partially matched and mechanisms may be provided to arbitrate among them, such as by picking the implied match comprising the least number of component financial instruments or the least number of synthesized orders (or, alternatively, the maximum thereof).

Upon receipt of an incoming order, or thereafter, the identification or derivation of a combination of one or more suitable counter orders that have not actually been received but if the counter orders were received, would allow at least a partial trade of the incoming order to be executed, is referred to as an "implied opportunity." As with implied matches, there may be numerous implied opportunities identified for a given incoming order. Implied opportunities are advertised to the market participants, such as via suitable synthetic orders, e.g. counter to the desired order, being placed on the respective order books to rest (or give the appearance that there is an order resting) and presented via the market data feed to appear available to trade in order to solicit the desired orders from the market participants. Depending on the number component financial instruments involved, and whether those component financial instruments further comprise component financial instruments of their own, there may be numerous alternative implied opportunities, the submission thereof, would allow the incoming order to be at least partially matched.

Implied opportunities, e.g. the advertised synthetic orders, may frequently have better prices than the corresponding real orders in the same contract. This may occur when two or more traders incrementally improve their order prices in the hope of attracting a trade, since combining the small improvements from two or more real orders may result in a big improvement in their combination. In general, advertising implied opportunities at better prices will encourage traders to enter the opposing orders to trade with the implied opportunities.

The more implied opportunities that the match engine of an electronic trading system can calculate/derive, the greater this encouragement will be and the more the Exchange will benefit from increased transaction volume. However, creating or identifying implied opportunities may be computationally intensive. Some exchanges actively manage implication complexity dependent on the technical performance cost such as reducing complexity in busy products (or times). When this occurs, the lack of implication fuels the perception of some end-users that liquidity tends to evaporate when the end-users trade. A reduction of implication means less liquidity for end-users and therefore suboptimal execution prices. A lack of liquidity or an evaporation of liquidity may additionally diminish the ability of traders to trade across markets.

As was discussed above, traders may use and/or outside trading interfaces may offer more complex implication computation than exchanges explicitly offer. The trading interfaces may aggregate market data to show theoretical liquidity from combinations of order books that are not offered in existing spreads. The interfaces typically generate combinations of orders that are submitted to the exchange on behalf of the client. Trading interfaces may submit the orders across multiple books at the same time. However, each individual leg or order may not be filled due to latency in the transmission or a previously available match being filled. The combinations of orders sent by vendors of implication calculations cannot be guaranteed to be fully executed (referred to as "legging risk"). Getting traded on a portion of such a combination may be worse than to not trade the combination altogether.

Trading interfaces may attempt to diminish legging risk by presenting near simultaneous orders. One method may include sending a plurality of trade requests; executing a transaction for a first portion of one of the plurality of trade requests and matching a second portion of the one of the plurality of trade requests against another of the plurality of trade requests. In certain scenarios, if the orders are executed across the different books at or near the same time, the legging risk may be obviated. However, a chance still exists for a third party to come in and execute a trade that involves some or all of the potential matched products. Certain systems may attempt to predict the availability of potential matches. However, these systems may not be perfect and as such do not eliminate legging risk. Other systems may split orders into smaller pieces that have a better chance of being filled. This may diminish the legging risk, such a system does not allow for a trader to execute a strategy in full, but rather may only partially fill an original order. Other systems may shift the risk from a trader to an exchange by guaranteeing a leg will be filled.

Systems may attempt to limit legging risk by limiting latency between a trading interface and one or more exchanges. For example, a system may sequence, match, or store orders or parts of orders in a particular manner in order to attempt to fill each leg. Exchanges may attempt to limit legging risk by organizing or scheduling orders. Orders may be matched in a sequence that limits legging risk. For example, related orders may be queued to match across different order books. The sequence may depend on recent order fills across multiple exchanges. Sequencing, however, does not eliminate legging risk. There still exists a possibility that one or more legs may go unfilled. Existing systems and existing technical solutions are unable to eliminate legging risk.

The disclosed embodiments relate generally to a type of electronic data transaction request, e.g. a combined electronic data transaction request or conditional mass order, and the processing thereof, that would eliminate legging risk by allowing the submitting trader to specify a desired set of orders along with one or more conditions for their execution, e.g. that the orders all must be fully executed (or executed at a specified minimum quantity) or none of the orders should be, where the transaction processing system will execute the set of orders according to the specified conditions, e.g. by ensuring that all of the orders may be fully executed prior to the execution of any of the orders. The disclosed processing of a conditional mass order, for example, structured in the form of an implied order thereby allows for simultaneous access to liquidity in separate pools of liquidity without need for, or in addition to, internal implication functionality. A conditional mass order may allow traders to utilize multiple degrees of implication complexity while limiting legging risk. The implication complexity may also be removed from the match engine that may allow for dramatically increased match engine performance.

While the disclosed embodiments may be discussed in relation to futures and/or options on futures trading, it should be appreciated that the disclosed embodiments may be applicable to any equity, fixed income security, currency, e.g. Spot Foreign Exchange (FX), commodity, options or futures trading system or market now available or later developed. It should be appreciated that a trading environment, such as a futures exchange as described herein, implements one or more economic markets where rights and obligations may be traded. As such, a trading environment may be characterized by a need to maintain market integrity, transparency, predictability, fair/equitable access and participant expectations with respect thereto. For example, an exchange must respond to inputs, such as trader orders, cancelations, etc., in a manner as expected by the market participants, such as based on market data, e.g., prices, available counter-orders, etc., to provide an expected level of certainty that transactions will occur in a consistent and predictable manner and without unknown or unascertainable risks. In addition, it should be appreciated that electronic trading systems further impose additional expectations and demands by market participants as to transaction processing speed, latency, capacity and response time, while creating additional complexities relating thereto. Accordingly, as will be described, the disclosed embodiments may further include functionality to ensure that the expectations of market participant are met, e.g., that transactional integrity and predictable system responses are maintained.

Electronic trading systems ideally attempt to offer an efficient, fair and balanced market where market prices reflect a true consensus of the value of products traded among the market participants, where the intentional or unintentional influence of any one market participant is minimized if not eliminated, and where unfair or inequitable advantages with respect to information access are minimized if not eliminated.

While the disclosed embodiments may be described in reference to the CME, it should be appreciated that these embodiments are applicable to any exchange. Such other exchanges may include a clearing house that, like the CME clearing house, clears, settles and guarantees all matched transactions in contracts of the exchange occurring through its facilities. In addition, such clearing houses establish and monitor financial requirements for clearing members and convey certain clearing privileges in conjunction with the relevant exchange markets.

The disclosed embodiments are also not limited to uses by a clearing house or exchange for purposes of enforcing a performance bond or margin requirement. For example, a market participant may use the disclosed embodiments in a simulation or other analysis of a portfolio. In such cases, the settlement price may be useful as an indication of a value at risk and/or cash flow obligation rather than a performance bond. The disclosed embodiments may also be used by market participants or other entities to forecast or predict the effects of a prospective position on the margin requirement of the market participant.

The methods and systems described herein may be integrated or otherwise combined with various risk management methods and systems, such as the risk management methods and systems described in U.S. Pat. No. 7,769,667 entitled "System and Method for Activity Based Margining", the entire disclosure of which is incorporated by reference herein and relied upon. For example, the methods and systems described herein may be configured as a component or module of the risk management systems described in the above-referenced patent. Alternatively or additionally, the disclosed methods may generate data to be provided to the systems described in the above-referenced patent. For example, the settlement prices determined by the disclosed embodiments may be incorporated into margin requirement(s) determined by the risk management method or system.

In one embodiment, the disclosed methods and systems are integrated or otherwise combined with the risk management system implemented by CME called Standard Portfolio Analysis of Risk™ (SPAN®). The SPAN system bases performance bond requirements on the overall risk of the portfolios using parameters as determined by CME's Board of Directors, and thus represents a significant improvement over other performance bond systems, most notably those that are "strategy-based" or "delta-based." Further details regarding SPAN are set forth in the above-referenced patent.

The embodiments may be described in terms of a distributed computing system. The particular examples identify a specific set of components useful in a futures and options exchange. However, many of the components and inventive features are readily adapted to other electronic trading environments. The specific examples described herein may teach specific protocols and/or interfaces, although it should be understood that the principles involved may be extended to, or applied in, other protocols and interfaces.

It should be appreciated that the plurality of entities utilizing or involved with the disclosed embodiments, e.g., the market participants, may be referred to by other nomenclature reflecting the role that the particular entity is performing with respect to the disclosed embodiments and that a given entity may perform more than one role depending upon the implementation and the nature of the particular transaction being undertaken, as well as the entity's contractual and/or legal relationship with another market participant and/or the exchange.

An exemplary trading network environment for implementing trading systems and methods is shown in FIG. 1. An exchange computer system 100 receives messages that include orders and transmits market data related to orders and trades to users, such as via wide area network 126 and/or local area network 124 and computer devices 114, 116, 118, 120 and 122, as will be described below, coupled with the exchange computer system 100.

Herein, the phrase "coupled with" is defined to mean directly connected to or indirectly connected through one or more intermediate components. Such intermediate components may include both hardware and software based components. Further, to clarify the use in the pending claims and to hereby provide notice to the public, the phrases "at least one of <A>, <B>, . . . and <N>" or "at least one of <A>, <B>, . . . <N>, or combinations thereof" are defined by the Applicant in the broadest sense, superseding any other implied definitions herebefore or hereinafter unless expressly asserted by the Applicant to the contrary, to mean one or more elements selected from the group comprising A, B, . . . and N, that is to say, any combination of one or more of the elements A, B, . . . or N including any one element alone or in combination with one or more of the other elements that may also include, in combination, additional elements not listed.

The exchange computer system 100 may be implemented with one or more mainframe, desktop or other computers, such as the example computer 200 described below with respect to FIG. 2. A user database 102 may be provided that includes information identifying traders and other users of exchange computer system 100, such as account numbers or identifiers, user names and passwords. An account data module 104 may be provided that may process account information that may be used during trades. A match engine module 106 may be included to match bid and offer prices and may be implemented with software that executes one or more algorithms for matching bids and offers. A trade database 108 may be included to store information identifying trades and descriptions of trades. In particular, a trade database may store information identifying the time that a trade took place and the contract price. An order book module 110 may be included to compute or otherwise determine current bid and offer prices, e.g., in a continuous auction market, or also operate as an order accumulation buffer for a batch auction market.

A market data module 112 may be included to collect market data and prepare the data for transmission to users. A risk management module 134 may be included to compute and determine a user's risk utilization in relation to the user's defined risk thresholds. An order processing module 136 may be included to decompose delta based and bulk order types for processing by the order book module 110 and/or match engine module 106. A message management module 140 may be included to, among other things, receive, and extract orders from, electronic messages as is indicated with one or more aspects of the disclosed embodiments. It should be appreciated that concurrent processing limits may be defined by or imposed separately or in combination, as was described above, on one or more of the trading system components, including the user database 102, the account data module 104, the match engine module 106, the trade database 108, the order book module 110, the market data module 112, the risk management module 134, the order processing module 136, the message management module 140, the fault tolerance module 142, or other component of the exchange computer system 100.

In an embodiment, the message management module 140, as coupled with the order book module 110, may be configured for receiving a plurality of electronic messages, each of the plurality of messages having an associated action to be executed within a designated period of time having a beginning time and an ending time, wherein at least one electronic message of the plurality of electronic messages comprises data representative of a particular time between the beginning and end of the period of time at which the action associated with the at least one electronic message is to be executed. The exchange computer system 100 may then be further configured to execute the action associated with the at least one temporally specific message at the particular time.

The message management module 140 may define a point of ingress into the exchange computer system 100 where messages are ordered and considered to be received by the system. This may be considered a point of determinism in the exchange computer system 100 that defines the earliest point where the system can ascribe an order of receipt to arriving messages. The point of determinism may or may not be at or near the demarcation point between the exchange computer system 100 and a public/internet network infrastructure.

One skilled in the art will appreciate that one or more modules described herein may be implemented using, among other things, a tangible computer-readable medium comprising computer-executable instructions (e.g., executable software code). Alternatively, modules may be implemented as software code, firmware code, hardware, and/or a combination of the aforementioned. For example the modules may be embodied as part of an exchange 100 for financial instruments.

The trading network environment shown in FIG. 1 includes exemplary computer devices 114, 116, 118, 120 and 122 which depict different exemplary methods or media by which a computer device may be coupled with the exchange computer system 100 or by which a user may communicate, e.g., send and receive, trade or other information therewith. It should be appreciated that the types of computer devices deployed by traders and the methods and media by which they communicate with the exchange computer system 100 is implementation dependent and may vary and that not all of the depicted computer devices and/or means/media of communication may be used and that other computer devices and/or means/media of communications, now available or later developed may be used. Each computer device, that may comprise a computer 200 described in more detail below with respect to FIG. 2, may include a central processor that controls the overall operation of the computer and a system bus that connects the central processor to one or more conventional components, such as a network card or modem. Each computer device may also include a variety of interface units and drives for reading and writing data or files and communicating with other computer devices and with the exchange computer system 100. Depending on the type of computer device, a user can interact with the computer with a keyboard, pointing device, microphone, pen device or other input device now available or later developed.

An exemplary computer device 114 is shown directly connected to exchange computer system 100, such as via a T1 line, a common local area network (LAN) or other wired and/or wireless medium for connecting computer devices, such as the network 220 shown in FIG. 2 and described below with respect thereto. The exemplary computer device 114 is further shown connected to a radio 132. The user of radio 132, which may include a cellular telephone, smart phone, or other wireless proprietary and/or non-proprietary device, may be a trader or exchange employee. The radio user may transmit orders or other information to the exemplary computer device 114 or a user thereof. The user of the exemplary computer device 114, or the exemplary computer device 114 alone and/or autonomously, may then transmit the trade or other information to the exchange computer system 100.

Exemplary computer devices 116 and 118 are coupled with a local area network ("LAN") 124 that may be configured in one or more of the well-known LAN topologies, e.g., star, daisy chain, etc., and may use a variety of different protocols, such as Ethernet, TCP/IP, etc. The exemplary computer devices 116 and 118 may communicate with each other and with other computer and other devices that are coupled with the LAN 124. Computer and other devices may be coupled with the LAN 124 via twisted pair wires, coaxial cable, fiber optics or other wired or wireless media. As shown in FIG. 1, an exemplary wireless personal digital assistant device ("PDA") 122, such as a mobile telephone, tablet based compute device, or other wireless device, may communicate with the LAN 124 and/or the Internet 126 via radio waves, such as via WiFi, Bluetooth and/or a cellular telephone based data communications protocol. PDA 122 may also communicate with exchange computer system 100 via a conventional wireless hub 128.

FIG. 1 also shows the LAN 124 coupled with a wide area network ("WAN") 126 which may be comprised of one or more public or private wired or wireless networks. In one embodiment, the WAN 126 includes the Internet 126. The LAN 124 may include a router to connect LAN 124 to the Internet 126. Exemplary computer device 120 is shown coupled directly to the Internet 126, such as via a modem, DSL line, satellite dish or any other device for connecting a computer device to the Internet 126 via a service provider therefore as is known. LAN 124 and/or WAN 126 may be the same as the network 220 shown in FIG. 2 and described below with respect thereto.

As was described above, the users of the exchange computer system 100 may include one or more market makers 130 that may maintain a market by providing constant bid and offer prices for a derivative or security to the exchange computer system 100, such as via one of the exemplary computer devices depicted. The exchange computer system 100 may also exchange information with other match or trade engines, such as trade engine 138. One skilled in the art will appreciate that numerous additional computers and systems may be coupled to exchange computer system 100. Such computers and systems may include clearing, regulatory and fee systems.

The operations of computer devices and systems shown in FIG. 1 may be controlled by computer-executable instructions stored on a non-transitory computer-readable medium. For example, the exemplary computer device 116 may include computer-executable instructions for receiving order information from a user, transmitting that order information to exchange computer system 100 in electronic messages, extracting the order information from the electronic messages, executing actions relating to the messages, and/or calculating values from characteristics of the extracted order to facilitate matching orders and executing trades. In another example, the exemplary computer device 118 may include computer-executable instructions for receiving market data from exchange computer system 100 and displaying that information to a user. In another example, the exemplary computer device 118 may include a non-transitory computer-readable medium that stores instructions for assigning orphaned jobs to surviving instances based on job loads and/or aggregate instance loads as described herein.

Of course, numerous additional servers, computers, handheld devices, personal digital assistants, telephones and other devices may also be connected to exchange computer system 100. Moreover, one skilled in the art will appreciate that the topology shown in FIG. 1 is merely an example and that the components shown in FIG. 1 may include other components not shown and be connected by numerous alternative topologies.

As shown in FIG. 1, the exchange computer system 100 further includes a message management module 140 that may implement, in conjunction with the market data module 112, the disclosed mechanisms for managing electronic messages containing financial data sent between an exchange and a plurality of market participants, or vice versa. However, as was discussed above, the disclosed mechanisms may be implemented at any logical and/or physical point(s) through which the relevant message traffic, and responses thereto, flows or is otherwise accessible, including one or more gateway devices, modems, the computers or terminals of one or more traders, etc.

Figure 2:
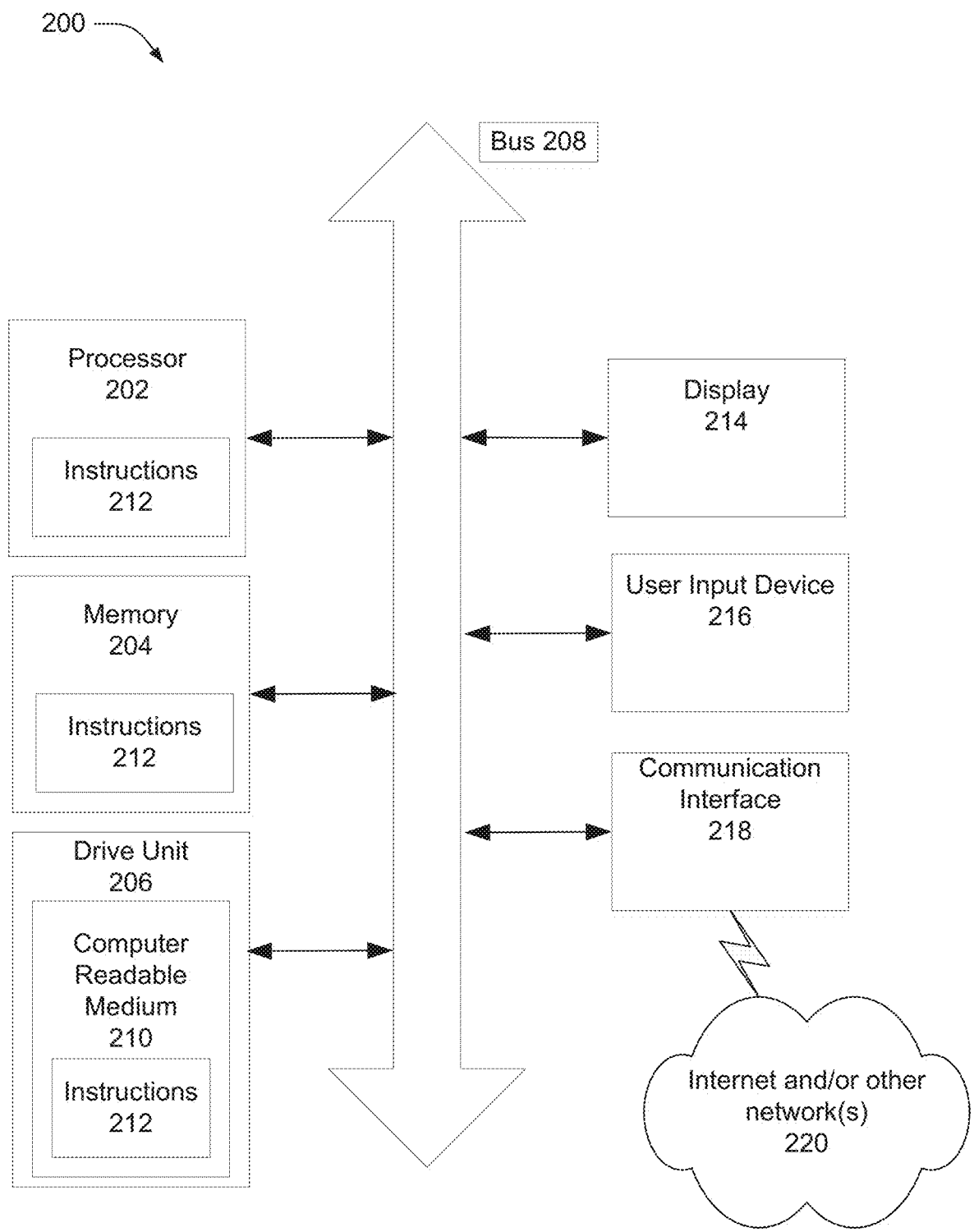
FIG. 2 depicts an illustrative embodiment of a general computer system for use with the disclosed embodiments.

Referring to FIG. 2, an illustrative embodiment of a general computer system 200 is shown. The computer system 200 can include a set of instructions that can be executed to cause the computer system 200 to perform any one or more of the methods or computer based functions disclosed herein. The computer system 200 may operate as a standalone device or may be connected, e.g., using a network, to other computer systems or peripheral devices. Any of the components discussed above, such as the processor 202, may be a computer system 200 or a component in the computer system 200. The computer system 200 may implement a match engine, margin processing, payment or clearing function on behalf of an exchange, such as the CME, of which the disclosed embodiments are a component thereof.

In a networked deployment, the computer system 200 may operate in the capacity of a server or as a client user computer in a client-server user network environment, or as a peer computer system in a peer-to-peer (or distributed) network environment. The computer system 200 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 200 can be implemented using electronic devices that provide voice, video or data communication. Further, while a single computer system 200 is illustrated, the term "system" shall also be taken to include any collection of systems or sub-systems that individually or jointly execute a set, or multiple sets, of instructions to perform one or more computer functions.

As illustrated in FIG. 2, the computer system 200 may include a processor 202, e.g., a central processing unit (CPU), a graphics processing unit (GPU), or both. The processor 202 may be a component in a variety of systems. For example, the processor 202 may be part of a standard personal computer or a workstation. The processor 202 may be one or more general processors, digital signal processors, application specific integrated circuits, field programmable gate arrays, servers, networks, digital circuits, analog circuits, combinations thereof, or other now known or later developed devices for analyzing and processing data. The processor 202 may implement a software program, such as code generated manually (i.e., programmed).

The computer system 200 may include a memory 204 that can communicate via a bus 208. The memory 204 may be a main memory, a static memory, or a dynamic memory. The memory 204 may include, but is not limited to computer readable storage media such as various types of volatile and non-volatile storage media, including but not limited to random access memory, read-only memory, programmable read-only memory, electrically programmable read-only memory, electrically erasable read-only memory, flash memory, magnetic tape or disk, optical media and the like. In one embodiment, the memory 204 includes a cache or random access memory for the processor 202. In alternative embodiments, the memory 204 is separate from the processor 202, such as a cache memory of a processor, the system memory, or other memory. The memory 204 may be an external storage device or database for storing data. Examples include a hard drive, compact disc ("CD"), digital video disc ("DVD"), memory card, memory stick, floppy disc, universal serial bus ("USB") memory device, or any other device operative to store data. The memory 204 is operable to store instructions executable by the processor 202. The functions, acts or tasks illustrated in the figures or described herein may be performed by the programmed processor 202 executing the instructions 212 stored in the memory 204. The functions, acts or tasks are independent of the particular type of instructions set, storage media, processor or processing strategy and may be performed by software, hardware, integrated circuits, firmware, microcode and the like, operating alone or in combination. Likewise, processing strategies may include multiprocessing, multitasking, parallel processing and the like.

As shown, the computer system 200 may further include a display unit 214, such as a liquid crystal display (LCD), an organic light emitting diode (OLED), a flat panel display, a solid state display, a cathode ray tube (CRT), a projector, a printer or other now known or later developed display device for outputting determined information. The display 214 may act as an interface for the user to see the functioning of the processor 202, or specifically as an interface with the software stored in the memory 204 or in the drive unit 206.

Additionally, the computer system 200 may include an input device 216 configured to allow a user to interact with any of the components of system 200. The input device 216 may be a number pad, a keyboard, or a cursor control device, such as a mouse, or a joystick, touch screen display, remote control or any other device operative to interact with the system 200.

In a particular embodiment, as depicted in FIG. 2, the computer system 200 may also include a disk or optical drive unit 206. The disk drive unit 206 may include a computer-readable medium 210 in which one or more sets of instructions 212, e.g., software, can be embedded. Further, the instructions 212 may embody one or more of the methods or logic as described herein. In a particular embodiment, the instructions 212 may reside completely, or at least partially, within the memory 204 and/or within the processor 202 during execution by the computer system 200. The memory 204 and the processor 202 also may include computer-readable media as discussed above.

The present disclosure contemplates a computer-readable medium that includes instructions 212 or receives and executes instructions 212 responsive to a propagated signal, so that a device connected to a network 220 can communicate voice, video, audio, images or any other data over the network 220. Further, the instructions 212 may be transmitted or received over the network 220 via a communication interface 218. The communication interface 218 may be a part of the processor 202 or may be a separate component. The communication interface 218 may be created in software or may be a physical connection in hardware. The communication interface 218 is configured to connect with a network 220, external media, the display 214, or any other components in system 200, or combinations thereof. The connection with the network 220 may be a physical connection, such as a wired Ethernet connection or may be established wirelessly as discussed below. Likewise, the additional connections with other components of the system 200 may be physical connections or may be established wirelessly.

The network 220 may include wired networks, wireless networks, or combinations thereof. The wireless network may be a cellular telephone network, an 802.11, 802.16, 802.20, or WiMax network. Further, the network 220 may be a public network, such as the Internet, a private network, such as an intranet, or combinations thereof, and may utilize a variety of networking protocols now available or later developed including, but not limited to TCP/IP based networking protocols.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a computer readable medium for execution by, or to control the operation of, data processing apparatus. While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein. The computer readable medium can be a machine-readable storage device, a machine-readable storage substrate, a memory device, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by specifically configured software programs executable by a computer system and/or by specifically configured computer systems. Further, in an exemplary, non-limited embodiment, implementations can include distributed processing, component/object distributed processing, and parallel processing. Alternatively, virtual computer system processing can be constructed to implement one or more of the methods or functionality as described herein.

Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP, HTTPS) represent examples of the state of the art. Such standards are periodically superseded by faster or more efficient equivalents having essentially the same functions. Accordingly, replacement standards and protocols having the same or similar functions as those disclosed herein are considered equivalents thereof.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose, e.g. specifically configured, microprocessors, and any one or more processors of any kind of digital computer. Generally, a processor will receive instructions and data from a read only memory or a random access memory or both. A computer generally includes a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a device having a display, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for user interaction as well. Feedback provided to the user can be any form of sensory feedback, e.g., visual feedback, auditory feedback, or tactile feedback. Input from the user can be received in any form, including acoustic, speech, or tactile input.

Embodiments of the subject matter described in this specification can be implemented in a computing system that includes a back end component, e.g., a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a LAN and a WAN, e.g., the Internet.

The computing system can include clients and servers. A client and server are generally remote from each other and typically interact through a communication network. The relationship of client and server arises by virtue of computer programs running on the respective computers and having a client-server relationship to each other.

Figure 3:
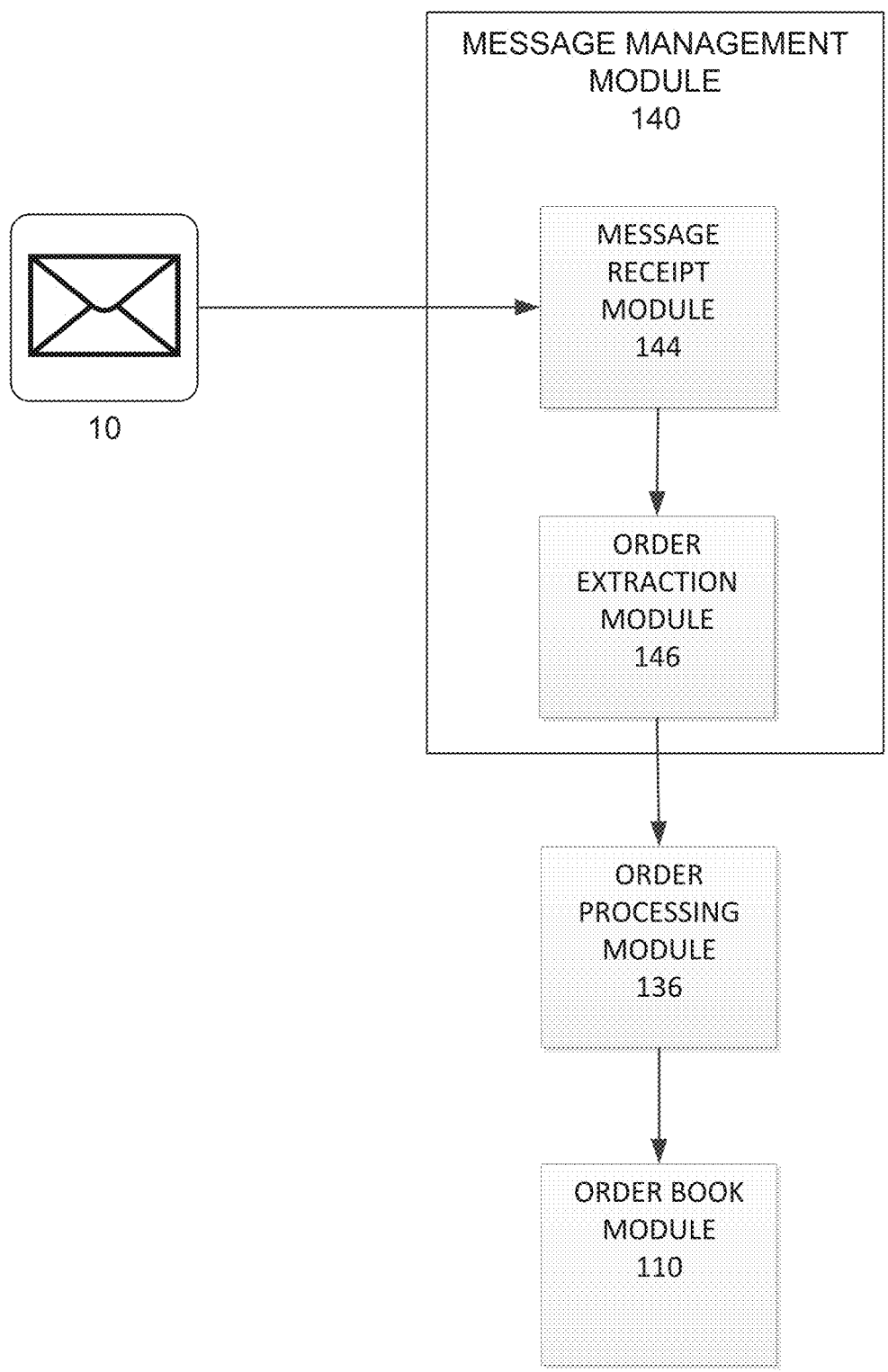
FIG. 3 depicts an example market order message management system that may be used to implement aspects of the disclosed embodiments.

FIG. 3 illustrates an embodiment of market order message management as implemented using the message management module 140 and order book module 110 of the exchange computer system 100. As such, a message 10 may be received from a market participant at the exchange computer system 100 by a message receipt module 144 of the message management module 140. The message receipt module 144 processes the message 10 by interpreting the content of the message based on the message transmit protocol, such as the transmission control protocol ("TCP"), to provide the content of the message 10 for further processing by the exchange computer system.

Further processing may be performed by the order extraction module 146. The order extraction module 146 may be configured to detect, from the content of the message 10 provided by the message receipt module 144, characteristics of an order for a transaction to be undertaken in an electronic marketplace. For example, the order extraction module 146 may identify and extract order content such as a price, product, volume, and associated market participant for an order. The order extraction module 146 may also identify and extract data indicating an action to be executed by the exchange computer system 100 with respect to the extracted order. The order extraction module may also identify and extract other order information and other actions associated with the extracted order. All extracted order characteristics, other information, and associated actions extracted from a message for an order may be collectively considered an order as described and referenced herein.

Order or message characteristics may include, for example, the state of the system after a message is received, arrival time (e.g., the time a message arrives at the MSG or Market Segment Gateway), message type (e.g., new, modify, cancel), and the number of matches generated by a message. Order or message characteristics may also include market participant side (e.g., buy or sell) or time in force (e.g., a good until end of day order that is good for the full trading day, a good until canceled ordered that rests on the order book until matched, or a fill or kill order that is canceled if not filled immediately).

The order may be communicated from the order extraction module 146 to an order processing module 136. The order processing module 136 may be configured to interpret the communicated order, and manage the order characteristics, other information, and associated actions as they are processed through an order book module 110 and eventually transacted on an electronic market. For example, the order processing module 136 may store the order characteristics and other content and execute the associated actions. In an embodiment, the order processing module may execute an associated action of placing the order into an order book for an electronic trading system managed by the order book module 110. In an embodiment, placing an order into an order book and/or into an electronic trading system may be considered a primary action for an order. The order processing module 136 may be configured in various arrangements, and may be configured as part of the order book module 110, part of the message management module 140, or as an independent functioning module.

The embodiments described herein utilize trade related electronic messages such as mass quote messages, individual order messages, modification messages, cancelation messages, etc., so as to enact trading activity in an electronic market. The trading entity and/or market participant may have one or multiple trading terminals associated with the session. Furthermore, the financial instruments may be financial derivative products. Derivative products may include futures contracts, options on futures contracts, futures contracts that are functions of or related to other futures contracts, swaps, swaptions, or other financial instruments that have their price related to or derived from an underlying product, security, commodity, equity, index, or interest rate product. In one embodiment, the orders are for options contracts that belong to a common option class. Orders may also be for baskets, quadrants, other combinations of financial instruments, etc. The option contracts may have a plurality of strike prices and/or comprise put and call contracts. A mass quote message may be received at an exchange. As used herein, an exchange 100 includes a place or system that receives and/or executes orders.

It should be appreciated that the disclosed embodiments may be applicable to other types of messages depending upon the implementation. Further, the messages may comprise one or more data packets, datagrams or other collection of data formatted, arranged configured and/or packaged in a particular one or more protocols, e.g., the FIX protocol, TCP/IP, Ethernet, etc., suitable for transmission via a network 214 as was described, such as the message format and/or protocols described in U.S. Pat. No. 7,831,491 and U.S. Patent Publication No. 2005/0096999 A1, both of which are incorporated by reference herein in their entirety. Further, the disclosed message management system may be implemented using an open message standard implementation, such as FIX or FIX/FAST, or by an exchange-provided API.

Figure 4:
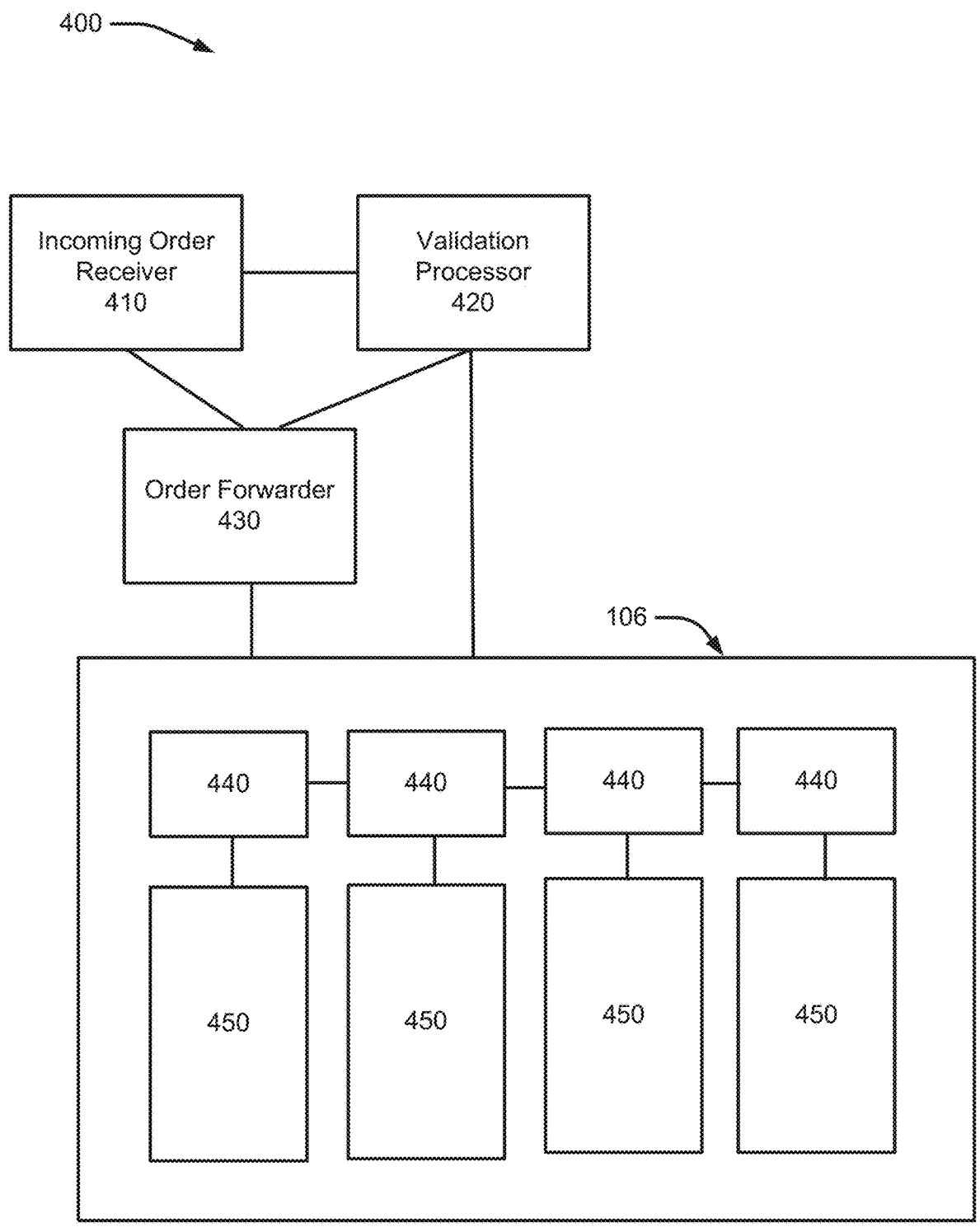
FIG. 4 depicts an example system for processing a conditional mass order.

FIG. 4 depicts an example system 400 for processing a combined electronic data transaction request message, e.g. for matching a conditional mass order (CMO). The system may execute multiple co-dependent transactions in an electronic data transaction processing system. A plurality of data items (e.g. instruments) may be transacted by one or more hardware matching processors 440. The hardware matching processors 440 match incoming electronic data transaction request messages (e.g. orders) as the messages are received. The orders for an instrument, based on a first set of transaction parameters (e.g. price, quantity, buy/sell) are matched with at least one other previously received but unsatisfied electronic data transaction request message counter thereto (e.g. resting order). The previously received but unsatisfied electronic data transaction request message may be stored in a memory 450 (e.g. order book) associated with the instrument. The mechanisms of the processing a combined electronic data transaction request message are discussed below.

The system 400 may be configured to execute multiple co-dependent transactions in an electronic data transaction processing system in which a plurality of data items are transacted by one or more hardware matching processors associated therewith. The one or more hardware matching processors match, as they are received, incoming electronic data transaction request messages, for one of the plurality of data items based on a first set of transaction parameters, received over a data communication network with at least one other previously received but unsatisfied electronic data transaction request message counter thereto stored in a memory associated with the plurality of data items coupled with the hardware matching processors, to at least partially satisfy one or both of the incoming electronic data transaction request messages or the at least one other previously received electronic data transaction request message.

The system 400 comprises an incoming order receiver 410, a validation processor 420, an order forwarder 430, one or more data structures 450 stored in one or more memories 204, and one or more hardware matching processors 440. The system 400 may include or be part of the match engine module 106, the order book module 110, the message management module 140, or the order processing module 136, or a combination thereof. The system 400 may receive input from the exchange computer system 100, the trade engine 138, the WAN 126, or a wireless hub 128. The incoming order receiver 410 is coupled with the validation processor 420, the order forwarder, and the one or more hardware matching processors 440. The validation processor 420 is further coupled to the order forwarder 430 and the one or more hardware matching processors 440. The order forwarder is further coupled to the one or more hardware matching processors 440. The hardware matching processors 440 are coupled with the data structures 450. The data structures 450 and/or the memories 204 in which they are stored and the one or more hardware matching processors 440 may comprise the match engine 400. In certain embodiments, the incoming order receiver 410, validation processor 420, order forwarder, data structures 450, and hardware matching processors 440 may comprise the match engine 400. In certain embodiments, the system 400 receives incoming messages (orders), processes the orders, and outputs a market data feed (the status of the data structures as will be described) and a processed order (from the hardware matching processors 440; to be sent to the message management module 140 for reporting).

The one or more hardware matching processors 440 are operable to match incoming electronic data transaction request messages with one or more previously received but unsatisfied, e.g. resting, orders stored in the one or more data structures 450/memories 204.

In certain embodiments, there may be a single hardware matching processor that is connected to each of the one or more data structures 450. A single hardware matching processor may operate sequentially, for example, first in first out. Messages or orders may be received from the validation processor 420 or the order forwarder 430 and placed in a queue. A single hardware matching processor may attempt to satisfy each order or message in the sequence that it arrives in the queue.

In certain embodiments, there may be multiple hardware matching processors 440 that are connected to the one or more data structures 450. Each hardware matching processor 440 may be assigned to a specific data structure 450. Each data structure, that may also be referred to as an order book, is associated with a particular "data item", e.g. tradeable product, and stores data representative of previously received but unsatisfied electronic data transaction requests for that particular data item. In certain embodiments, hardware matching processors 440 may be assigned to multiple data structures 450. For multiple hardware matching processors, messages or orders may be received from the validation processor 420 or the order forwarder 430 and sent to the hardware matching processor 440 that is responsible for the data item in the message or order. Each individual hardware matching processor 440 may have a separate queue for orders. In operation, each hardware matching processor 440 may be sent an instruction from the validation processor to prohibit modification of one or more of the data structures 450 with which it is coupled, i.e. the hardware matching processor 440 and/or data structures 450 may be locked. The hardware matching processor may be locked from attempting to fill or match an order in the specified data structure 450. By locking the hardware matching processor 440 or the specified data structure 450, the validation processor 420 may ensure that an outside order may not be processed and match against a resting order before the component order, thus negating the ability of the validation processor 420 to guarantee that a component order in a CMO will be fully satisfied. The command to prohibit adjustment (or lock) may be sent from the validation processor 420 or the order forwarder 430. The command to prohibit adjustment may be sent from a master hardware matching processor. One or more of the hardware matching processors 440 may be considered a master hardware matching processor. A master hardware matching processor may control other hardware matching processors, such as giving instructions or managing queues. Once a CMO order has been validated and forwarded, an unlock command may be transmitted by the validation processor 420 or the order forwarder 430.

The data structures 450, each of which may be referred to as an "order book" or "order book database", may be operable to store data indicative of previously received but unsatisfied electronic data transaction request messages, e.g. "resting orders", and may be stored in memory 204 or other storage device. The data stored in the data structures 450 may represent order books for the data items. The data items may be tradeable products such as financial instruments, e.g., futures and options on futures, swaps, such as currency (FX) swaps, etc. Each data structure 450 or order book for a product may be referred to as a market for the product. Electronic trading of financial instruments, such as futures contracts or currency swaps, is conducted by market participants sending orders, such as to buy or sell one or more futures contracts, in electronic form to the Exchange. These electronically submitted orders to buy and sell are then matched, if possible, by the Exchange, i.e. by the Exchange's match engine 400, to execute a trade. Outstanding (unmatched, wholly unsatisfied/unfilled or partially satisfied/filled) orders are maintained in one or more data structures 450 or databases referred to as "order books," such orders being referred to as "resting," and made visible, i.e., their availability for trading is advertised, to the market participants through electronic notifications/broadcasts, referred to as market data feeds. An order book is typically maintained for each product, e.g. instrument, traded on the electronic trading system and generally defines or otherwise represents the state of the market for that product, i.e. the current prices that the market participants are willing buy or sell that product.

The incoming order receiver 410 may be operable to receive incoming electronic data transaction request messages from the network and store the received incoming electronic data transaction request messages in a buffer. The buffer may located in or a segment of memory 204. The incoming order receiver 410 may forward the received incoming electronic data transaction request messages to the particular hardware matching processor 440 for the particular data structure 450 of the data item of the received incoming electronic data transaction request message. The incoming order receiver 410 is further operative to receive a combined electronic data transaction request comprising a conditional execution instruction and a plurality of component electronic data transaction request messages, each for transaction of a different data item of the plurality of data items. The incoming order receiver 410 may store the combined electronic data transaction request in the buffer. The combined electronic data transaction request may be referred to as a conditional mass order (CMO). The CMO may include a conditional execution instruction (CEI) and a plurality of component electronic data transaction request messages (legs). When the incoming order receiver 410 (receiver) receives a normal order, the receiver 410 stores the order in the buffer. The receiver 410 then forwards the normal order to an appropriate match processor that handles the instrument and the respective data structure (order book). When the receiver 410 identifies an order as a CMO, the receiver 410 forwards the CMO to the validation processor 420.

The validation processor 420 may be operable to validate the conditional execution instruction, e.g. to validate if each of the plurality of component electronic data transaction request messages may be matched with at least one other previously received but unsatisfied electronic data transaction request message counter thereto stored in the data structure 450 to satisfy the conditional execution instruction. The validation processor 420 determines if the CEI is capable of being satisfied in light of the present state of the one or more order books 450 that correspond to the one or more legs or component orders in the CMO. The CEI may specify one or more conditions under which it may be satisfied. The CEI, for example, may require that the each leg be capable of being fully satisfied, or satisfied at a minimum quantity, e.g. the smallest quantity of any of the component transactions (which may be referred to as Fill and Kill (FAK)), by one or more resting orders on the respective order book 450. The CEI may further specify constraints on what prices may satisfy any one or more of the component transactions, on combinations of subsets and alternatives thereto, or combinations thereof. In on embodiment, the CEI may take the form of a Boolean expression utilizing combinations of Boolean operators, e.g. AND, OR, XOR, IF/THEN, NOT, etc., to define what combination of the component transactions, or subsets thereof, and according to what parameters, e.g. price and/or quantity parameters, may satisfy the CEI. Where a CEI specifies full satisfaction of all of the component transactions, referred to as Fill or Kill (FOK), in order to determine if the orders may be fully satisfied, the validation processor 420 may send test messages (orders) to the hardware matching processors 440. The hardware matching processors 440 may attempt to match the test orders against the order books and return either a success or failure message to the validation processor 420. The validation processor 420 may collect the success and failure messages and then uses these messages to determine if the CEI has been satisfied. In certain embodiments, the validation processor 420 may only perform checks again real orders. Implied or synthetic orders may be less reliable as they may be removed if related orders are filled.

In certain embodiments, the validation processor 420 may send a command to the hardware matching processors 440 (or directly to the order books 450) to lock (prohibit any changes) the order books. By locking the order books 450, other orders are prohibited from being matched and therefore changing the state of the order books 450 (and therefore the analysis of the validation processor 420 of whether the CEI may be satisfied with the current state of the order books). The validation processor 420 may send an unlock message after validating the CMO. In certain embodiments, the unlock message may be sent only after the component orders have been matched. The lock command may remain in effect for a defined period of time. In an embodiment, the lock command may remain in effect indefinitely until one or more conditions have been met. For example, the lock command may persist until a CMO has been rejected or confirmed.

If the validation processor 420 determines that the CEI will not be satisfied, for example by receiving one or more failure messages, the validation processor 420 may reject the CMO. The validation processor 420 may send a message to the exchange system with the information and reason why the CMO was rejected. The validation processor 420 may also send a message to the incoming order receiver 410 that it is ready for a new message/order.

If the validation processer determines that the CEI will be satisfied with the current state of the order books, the validation processor 420 then sends an instruction to the order forwarder to release the component orders for matching.

The order forwarder is operable to upon the occurrence of the validation processor 420 validating that the conditional execution instruction will be satisfied, forward each of the plurality of component electronic data transaction request messages to the one or more hardware matching processors 440.

Figure 5:
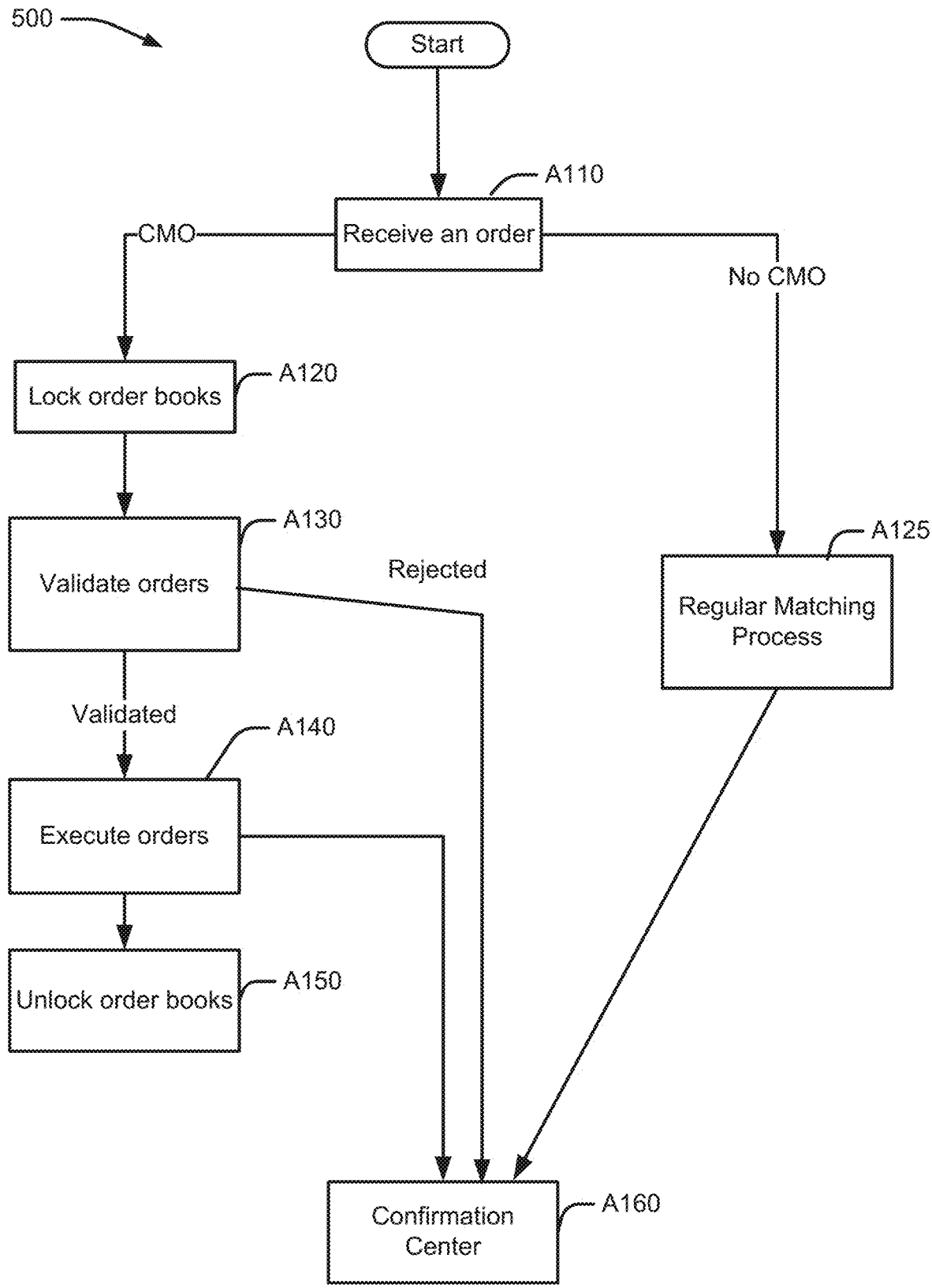
FIG. 5 depicts an example flowchart depicting operation of the system of FIG. 4 for processing a conditional mass order.

FIG. 5 depicts an example flowchart 500 for matching a conditional mass order (CMO). Additional, different, or fewer acts may be provided. The acts are performed in the order shown or other orders. The acts may also be repeated. Certain acts may be skipped. For example, Acts A120 and A150 may not be performed if there is a single match engine 400 (including a single hardware matching processor) that processes each order in sequence.

At Act A110 the match engine 400 receives an order. If the order is a CMO, the match engine 400 proceeds to Act A120. If the order is not a CMO, such as a regular order to buy or sell a single instrument, the match engine 400 attempts to match the order at Act A125 against resting orders in an order book (which may be referred to as an "order book database" or "data structure") that the regular order is placed for. For a CMO, the match engine 400 uses a separate process that may include the acts A120, A130, A140, and A150. Acts A120, A130, A140, and A150 may be performed with multiple match engines 400 or a single match engine 400. These Acts may be performed serially or in parallel. Prior to Act A140, the process may be stopped or cancelled by an end-user.

Traders trading on an exchange including, for example, exchange computer system 100, may desire to trade multiple financial instruments in combination. Each component or order of the combination may be called a leg. Traders may submit orders for individual legs or in some cases can submit a single order for multiple financial instruments in an exchange-defined combination. Such orders may be called a combination order, a strategy order, a spread order, or a variety of other names. For a combination order the orders for individual legs may run the risk of not being filled and therefore generate an unwanted position. In order to guarantee that the legs or order be filled, Traders may submit a conditional mass order (CMO). A CMO may contain several legs or orders (orders 1 to N) and a Conditional Execution Instruction (CEI). The CEI indicates the way the match engine 400 should process the orders contained in the CMO. In certain embodiments, a trader may submit a complex trading strategy that includes one or more orders. For example, a trader may submit a legacy combination order that may be broken down by the match engine 400 into a CEI and individual legs.

In certain embodiments, the CMO may be received as a Fill or Kill order (FOK). A FOK order uses a type of time-in-force designation that instructs the exchange to execute a transaction immediately and completely or not at all. The order must be filled in its entirety or canceled (killed). The purpose of a fill or kill order is to ensure that an entire position is entered at a desired price.

In certain embodiments, the CMO may not be received as a FOK order, but rather may be cycled back though the match engine 400 if one or more legs are rejected. A CMO may have a limited number of attempts or a time frame (time in force) for attempts to be made to fill the CMO. A CMO may alternatively be good till canceled (GTG). Other conditions may be included in the CMO as a whole or for the individual orders that make up the CMO. For example, a CMO or an order may include trigger values that further limit beyond price when an order may be filled.

In certain embodiments, the CMO may be received as a Fill and Kill order (FAK). A FAK order uses a minimum quantity, e.g. the smallest quantity of the component transaction. The CMO requires that the minimum quantity must be fillable for the CEI to be validated. For example, a trader may want a GEZ6 position and see 10 contracts in GEZ5 and 10 contracts in GEZ5-GEZ6. By the time a CMO (buy 10 GEZ5, buy 10 GEZ5-GEZ6, CEI: FAK) reaches the matching engine only 5 contracts in GEZ5 are left. A CMO with a CEI set to FAK will execute 5 in both contracts.

Figure 6A:
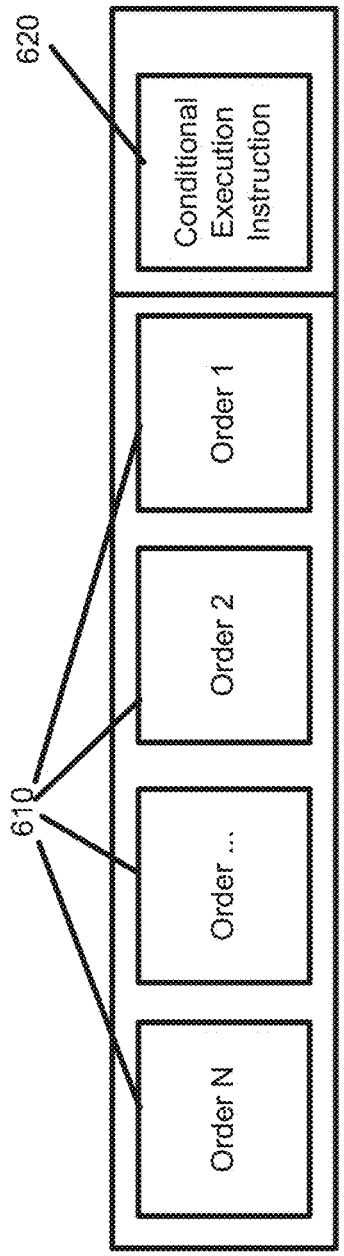
FIGS. 6A, 6B, and 6C depict example structures of an electronic data transaction request message comprising a conditional mass order.
Figure 6B:
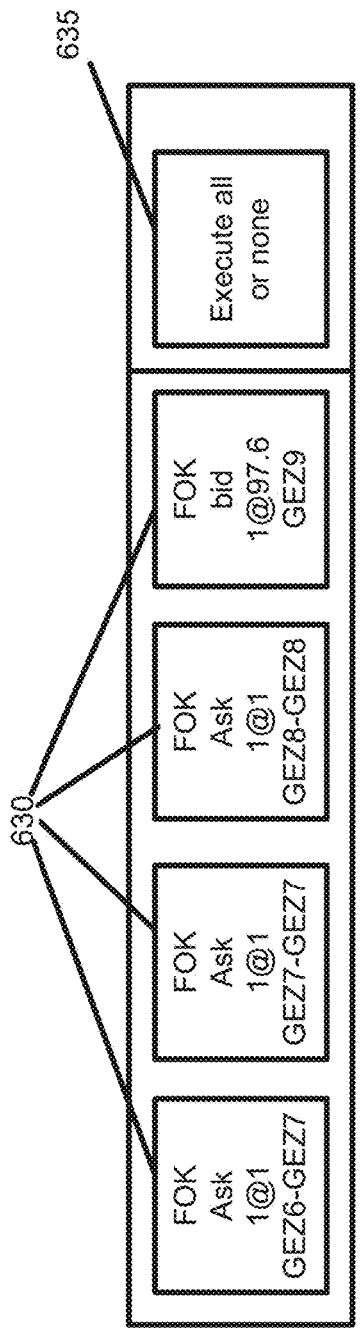
Figure 6C:
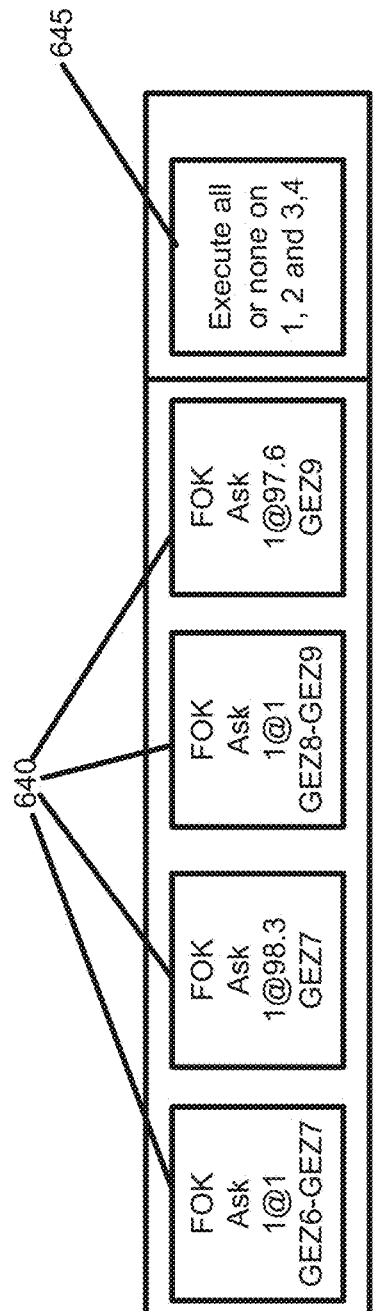

FIG. 6A-6C depict example structures of a CMO. FIG. 6A depicts a template with a Conditional Execution Instruction 620 and Orders 1 to N 610. FIG. 6B illustrates an example CMO with four orders 630 and a CEI 635 that has a requirement of execute all or none. This combination—if all orders are executable, and thus the CMO accepted—would result in a 1 contract (GEZ9+(GEZ8−GEZ9)+(GEZ7−GEZ8)+(GEZ6−GEZ7)=) GEZ6 position. Alternatively—if one or more of the FOKs would not be executable (no resting orders available at the limit price or better)—the CMO would be rejected and none of the orders executed. FIG. 6C illustrates a second example CMO with fours orders 640 and a CEI 645 that has a requirement of execute all or none on orders 1, 2, and 3, 4. In this case, the execution of order 1 and 2 are conditional on each other and order 3 and 4 are conditional on each other. Therefore, this CMO either results in a 1 contract GEZ6 position and a 1 contract GEZ8 position, a 1 contracts GEZ6 position, a 1 contract GEZ8 position or no position at all.

A CEI may include a single condition or multiple conditions. A CEI may indicate that the orders in the CMO are to be either all accepted or all rejected. For example, the CMO includes orders A, B, C, and D and the CEI indicates that all are too be accepted or all rejected. If any of A, B, C, or D is unable to be filled, all of A, B, C, and D will be rejected.

The CEI may also group orders together so that each group of orders cancels the other group if it executes. For example, a CMO contains orders A, B, C, and D. The CEI indicates that AB and CD are conditional on each other but if AB is accepted then it cancels CD or if CD is accepted it cancels AB. The CEI may indicate which group takes priority, to resolve a situation if both AB and CD were potentially accepted.

The CEI may indicate which orders within the CMO are conditional on each other (and therefore are to be either all accepted or all rejected together). For example, the CMO contains orders A, B, C, D, and E. A, B, and C are conditional on each other. D and E are conditional on each other and also on ABC. If any of A, B, or C is reject, all orders will be cancelled. If A, B, and C are acceptable, then A, B, and C will be filled. If A, B, C, D, and E are all acceptable, then each order will be filled.

In certain embodiments, there is one queue for all orders. Regardless of if the orders are CMOs or any other order type, each order may be processed in sequence of arrival. In certain embodiments, there may be multiple queues or multiple match engines 400. Orders may be processed in parallel or using a priority based system. In certain embodiments, there may be a limit on the number of orders in the CMO.

At act A120, the match engine 400 locks one or more order books. Order books may constantly change as orders are received. Orders may be matched that were resting on the order book. Incoming orders that were not matched may be added to the order book. Implied orders or synthetic orders may also be added to the order book. In certain embodiments, the order books comprise only real orders.

In a typical matching process, an order is processed sequentially by a match engine 400. The order is received then either filled or placed in the order book. In an embodiment with one or more match engines or queues, the order book may be accessed by multiple sources. If, for example, a first match engine 400 is attempting to fill multiple conditional order, the system runs a risk of having an order book changed by the actions of a second match engine 400 before the attempt is completed. As such, when a match engine 400 processes a conditional order, the match engine 400 may lock each order book that the CMO affects. A lock may prevent other match engines from accessing the order book to fill orders or for implication.

In certain embodiments, every order book is locked. In certain embodiments, only order books that may be affected the orders in the CMO are locked. Order books that are related to the orders in the CMO may be locked. Related order books may include order books that include similar types of instruments or order books that historically have been affected by past CMOs.

At act A130, the match engine 400 checks to see if the individual orders in the CMO may be fully executed (transacted). The check (or first pass) may consist of the match engine 400 attempting to execute an order without actually filling the order. Each order may be validated against resting orders in the respective order book. For each order, the match engine 400 may attempt to execute the order as normal, but not alter the order book or generate a fill or confirmation message. The only output may from the validation may be to alter a flag or bit that is tied to the order. For example, if an order is capable of being fully filled (there is a valid amount of resting liquidity in the respective order book), the match engine 400 may indicate by flagging the order or leg as having been validated. The match engine 400 may not make any changes to the order book at this point.

In certain embodiments, the match engine 400 may generate a copy of the order book as it would exist if the order was executed. This copy of the order book may be used to validate other orders in the CMO. The match engine 400 may also record the details of the potential match for later use, for example if the order is later executed. Since the information about the match is already known and the updated order book already calculated, the match engine 400 may not have to recalculate each order.

In certain embodiments, if the validation or check fails at any point, the match engine 400 may proceed to act A150 and reject the CMO. In certain embodiments, the match engine 400 may perform the check for each order and each order book regardless of if part of the CEI fails. The CEI and therefore CMO may be rejected for multiple reasons. The identity of the reasons for failure may be beneficial to the trader who placed the original order. If the conditions in the CEI are not met, the match engine 400 may not generate a resting order as may normally occur for a non-matched order and the order may not be altered.

The match engine 400 may check each order sequentially or using parallel processing. In order to save time and operate efficiently, the match engine 400 (or more than one match engine 400) may simultaneously check each order against their respective order books. For certain order books that include implied orders, the match engine 400 may perform the check sequentially. For example, if an order from the CMO is matched against a synthetic order it may affect a separate order book. If that separate order book is related to an order in the CMO, the entire validation of the CMO may be in doubt. If the match engine 400 performs the checking sequentially, the match engine 400 may re-arrange the sequence of the orders. For example, the match engine 400 may check larger orders in the CMO first or orders that may be more likely not to match.

After each order has been validated (or not validated), the match engine 400 determines if the CEI has been met. If the CEI has not been met, the order is rejected and the match engine 400 proceeds to Act A150. If the match engine 400 determines that the CEI for the orders in the CMO have been met, the match engine 400 proceeds to Act A140. At Act A140, the match engine 400 matches and executes the orders according to the CEI. At Act A150, the match engine 400 unlocks the order books. Acts A140 and A150 may be performed simultaneously or in sequence. When the match engine 400 fills an order, the match engine 400 may unlock the respective order book and update the order book with the newly filled order. Once the order book is unlocked, other match engines 400 or processes may access the order book.

At act A160, the match engine 400 generates confirmations. The match engine 400 identifies each rejection or confirmation. The match engine 400 then forwards these to the message management module, and triggers the next order to be processed. The updated order book may also be published.

Figure 7:
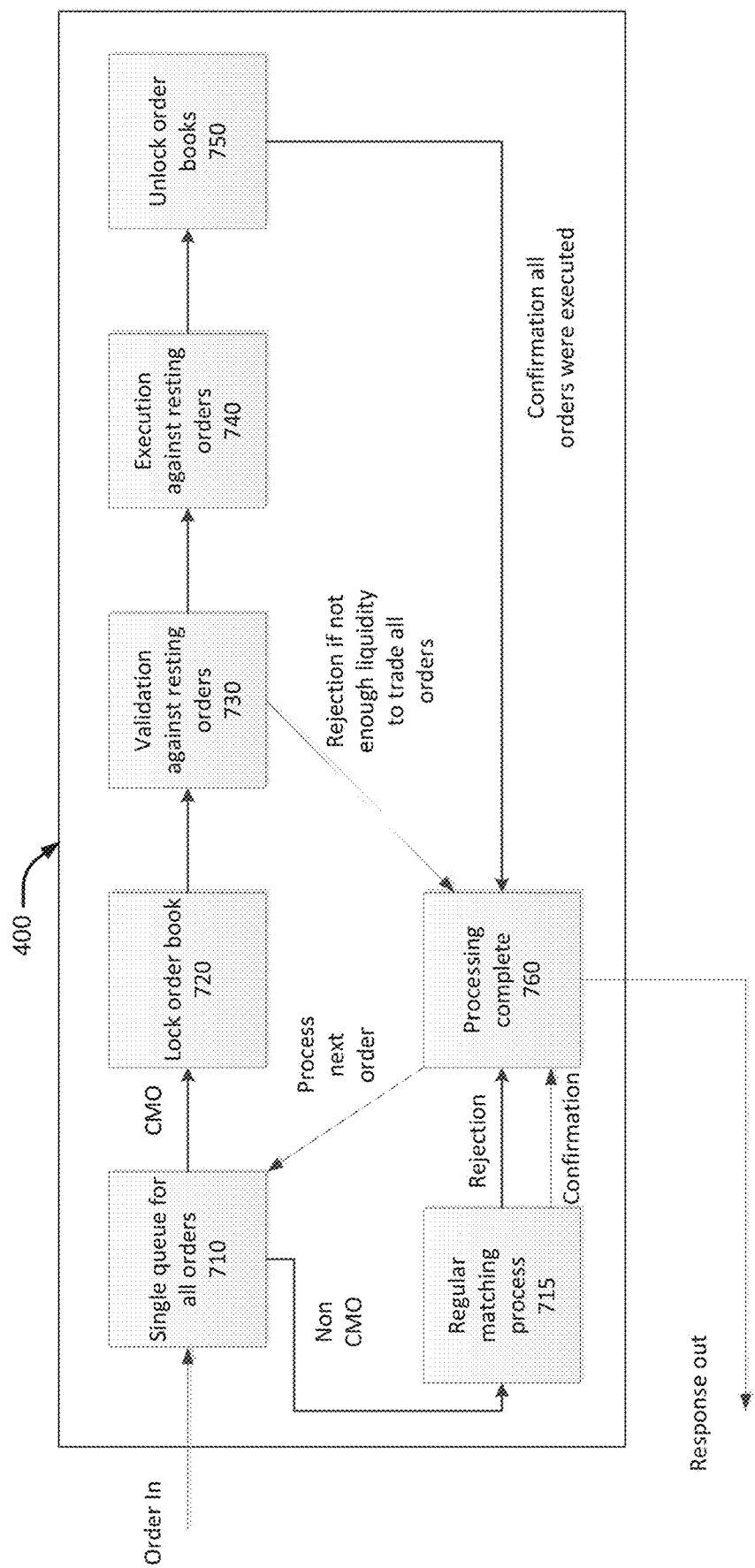
FIG. 7 depicts an example flowchart depicting operation of a matching engine.

FIG. 7 depicts an example flowchart for a matching engine 400. The matching engine receives an order at block 710. The order is entered into a single queue for all orders. If the order is a Non CMO order, a regular matching process 715 is performed. The result is either a rejection or confirmation for the order. The processing is complete 760 and the match engine processes the next order.

If the order is a CMO, at act 720, the order books are locked. The CMO may include one or more orders that relate to one or more order books. In an embodiment, every order book is locked. In certain embodiments, only order books that may be affected the orders in the CMO are locked. Order books that are related to the orders in the CMO may be locked. Related order books may include order books that include similar types of instruments or order books that historically have been affected by past CMOs. By locking the order books, the matching engine prohibits other orders in those books from being filled and removing orders that may be used for the CMO.

At step 730, the match engine checks to see if all orders in the CMO can be executed. Each order in the CMO may be conditionally matched against orders in specific locked related order books. The conditional matching process may involve checking that both price and quantity is available for the orders. Each order book for a product may be referred to as a market for the product. Outstanding (unmatched, wholly unsatisfied/unfilled or partially satisfied/filled) orders are maintained in one or more memories or other storage devices, such as in one or more data structures or databases stored therein referred to as "order books," such orders being referred to as "resting." An order book is typically maintained for each product, e.g. instrument, traded on the electronic trading system and generally defines or otherwise represents the state of the market for that product, i.e. the current prices at which the market participants are willing buy or sell that product. Validating each order may involve determining if there is enough quantity in a resting order to fill the order. In an embodiment, each component order in the CMO may be checked sequentially. In an embodiment, the component orders may be ranked according to likelihood of being matched. The orders may be ranked by quantity. When validating the orders, the validation process may validate each order in a series or in parallel. If the orders are validated in series, the process may be halted as soon as one of the component orders cannot be matched.

If there is enough liquidity in the resting orders for each of the orders, the match engine executes the order against resting the resting liquidity at step 740. Each of the component orders in the CMO may be executed against their respective resting orders. If, however, one or more of the orders cannot be executed, for example, if there is not resting liquidity in the respective order book, then the CMO is rejected. Once the CMO has been executed or rejected, the books then are unlocked at step 750.

The match engine then proceeds to step 760: a central point where all rejections/confirmations are collected. The rejections or confirmations are forwarded by the messaging system (response). The next order is triggered to be processed.

Figure 8:
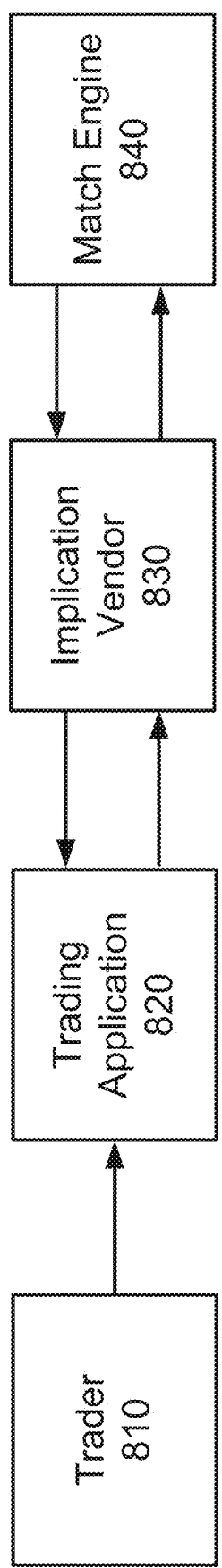
FIG. 8 depicts an example system for processing a conditional mass order

In FIG. 5 described above, the CMO was received directly at the match engine 400. In certain embodiments, there may be one or more layers between the match engine 400 and a trader. For example, as depicted in FIG. 8, a trading application 820 operates between a trading application and matching engine.

The match engine 400/840 provides a raw order book feed to the implication vendor 830. The raw order book feed includes no implied orders. The Implication vendor 830 inputs generated implied orders to the feed and then provides an enriched order book feed to the trading application 820. In certain embodiments, the implication vendor and/or the trading applications are embedded within an exchange structure.

The trading application 820 receives a selection of implied opportunities from a trader 810. A trader, for example, may generate the selection using trading software. The trader may transmit the selections to the trading application. The trading application sends a request to an implication vendor 830 to execute the implied opportunity. The trading application generates the CMO including the CEI.

The trading application submits the CMO to the match engine 400/840. In this embodiment, the match engine 400/840 may be using order books that include only real orders (no implied orders). Implied orders are only added to the order books at the implication vendor for advertisement on a market feed. With no implied orders in the order books used by the match engine 400/840 and no need to calculate or generate implied orders, the match engine may be able to process orders more efficiently.

In certain embodiments, the implication vendor identifies a combination orders and any respective legs. For example, a trader may request an order with a complex implication strategy. The implication vendor may separate the order into real orders. The legs may then be sent to the match engine 400/840 as a CMO. For example, an order is received at the implication vendor for a combination comprising two legs A and B. The implication vendor then identifies the combination as two orders A and B that are then packaged together with a CEI to generate a CMO that is sent to the match engine 400/840. The trader is guaranteed to have either both A and B fully satisfied or nothing.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings and described herein in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. § 1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

It is therefore intended that the foregoing detailed description be regarded as illustrative rather than limiting, and that it be understood that it is the following claims, including all equivalents, that are intended to define the spirit and scope of this invention.

What is claimed is:

1. A system for controlling execution of multiple co-dependent transactions in an electronic data transaction processing system, the system comprising:
    one or more data structures configured to store data indicative of at least one other previously received but unsatisfied electronic data transaction request message;
    a plurality of hardware matching processors configured to receive incoming electronic data transaction request messages and to transact a plurality of data items with the plurality of data items that match, as they are received, the incoming electronic data transaction request messages, for one of the plurality of data items based on a first set of transaction parameters, received over a data communication network with the at least one other previously received but unsatisfied electronic data transaction request message counter thereto stored in the one or more data structures, the one or more data structures stored in a first non-transitory memory associated with the plurality of data items coupled with the plurality of hardware matching processors, to at least partially satisfy one or both of the incoming electronic data transaction request messages or the at least one other previously received electronic data transaction request message, each particular hardware matching processor of the plurality of hardware matching processors coupled with and assigned to a particular data structure of the one or more data structures, each particular data structure associated with a different particular data item; and
    a processor separate from the plurality of hardware matching processors and coupled with a second non-transitory memory and the plurality of hardware matching processors, the second non-transitory memory storing computer executable instructions that, when executed by the processor, implement:
    an incoming order receiver including an interface coupled with the data communications network and configured to receive incoming electronic data transaction request messages from the data communications network and store the received incoming electronic data transaction request messages in a buffer memory coupled with the incoming order receiver prior to forwarding the received incoming electronic data transaction request messages to the particular hardware matching processor for the particular data structure of the data item of the received incoming electronic data transaction request message;
    the incoming order receiver being further configured to receive, from the data communications network, a combined electronic data transaction request comprising a conditional execution instruction and a plurality of component electronic data transaction request messages, each for transaction of a different data item of the plurality of data items, the conditional execution instruction defining how each of the plurality of component electronic data transaction request messages are to be processed by the system;
    a validation processor, coupled with the incoming order receiver and the plurality of hardware matching processors, configured to, instead of forwarding each of the plurality of component electronic data transaction request messages to the plurality of hardware matching processors, determine that each of the plurality of component electronic data transaction request messages may be matched with at least one other previously received but unsatisfied electronic data transaction request message counter thereto stored in the one or more data structures to satisfy the conditional execution instruction, the validation processor further configured to lock a subset of the one or more data structures, the subset of the one or more data structures associated with a particular data item related to at least one of the plurality of component electronic data transaction request messages to prevent modification of the stored previously received but unsatisfied electronic data transaction request messages by other subsequently received incoming electronic data transaction request messages while determining that the conditional execution instruction can be satisfied, wherein the lock of the subset of the one or more data structures comprises sending, by the validation processor, an instruction to each particular hardware matching processor of the plurality of hardware matching processors coupled with each of the subset of the one or more data structures to prohibit modification of each particular data structure of the subset of the one or more data structures coupled therewith which prevents each particular hardware matching processor coupled with each of the subset of the one or more data structures from processing subsequently received incoming electronic data transaction request messages from the data communications network,
    wherein the validation processor is further operable to, subsequent to the lock of the subset of the one or more data structures, forward test messages for each of the plurality of component electronic data transaction request messages to a respective plurality of hardware matching processors to determine if each of the plurality of component electronic data transaction request messages may be fully satisfied by at least one previously received but unsatisfied electronic data transaction request message counter thereto stored in the subset of the one or more data structures, wherein the determination includes simultaneously checking the test messages, by the respective plurality of hardware matching processors, using parallel processing; and
    an order forwarder, coupled with the first non-transitory memory, the validation processor, the incoming order receiver and the plurality of hardware matching processors, configured to, upon occurrence of the validation processor determining that the conditional execution instruction can be satisfied, forward each of the plurality of component electronic data transaction request messages to the plurality of hardware matching processors in accordance with the conditional execution instruction, and upon occurrence of the validation processor determining that the conditional execution instruction cannot be satisfied, reject the combined electronic data transaction request, wherein the validation processor is further configured to unlock the subset of the one or more data structures stored in the first non-transitory memory, only subsequent to the forwarding or rejecting, to allow modification of any of the at least one other previously received but unsatisfied electronic data transaction request message counter thereto stored in the subset of the one or more data structures associated with the plurality of data items, wherein the unlock of the subset of the one or more data structures comprises sending, by the validation processor, an instruction to each particular hardware matching processor coupled with each of the subset of the one or more data structures to allow modification of the subset of the one or more data structures which enables each particular hardware matching processor coupled with each of the subset of the one or more data structures to process subsequently received incoming electronic data transaction request messages from the data communications network.

2. The system of claim 1, wherein the conditional execution instruction is satisfied if each of the plurality of component electronic data transaction request messages may be fully satisfied by at least one other previously received but unsatisfied electronic data transaction request message counter thereto stored in the one or more data structures stored in the first non-transitory memory.

3. The system of claim 1, wherein the plurality of hardware matching processors is operable to prevent modification of the stored previously received but unsatisfied electronic data transaction request messages while the validation processor determines if the conditional execution instruction can be satisfied.

4. The system of claim 1, wherein the validation processor is further operable to reject the combined electronic data transaction request if the conditional execution instruction cannot be satisfied.

5. The system of claim 4, wherein the conditional execution instruction cannot be satisfied if one or more of the plurality of component electronic data transaction request messages may not be fully satisfied with at least one other previously received but unsatisfied electronic data transaction request message counter thereto stored in the one or more data structures stored in the first non-transitory memory.

6. The system of claim 1, wherein each of the plurality of component electronic data transaction request messages comprises a leg of a combination order.

7. The system of claim 1, wherein the incoming order receiver, the validation processor, the order forwarder, the plurality of hardware matching processors, and the one or more data structures stored in the first non-transitory memory comprise a match engine.

8. A computer implemented method for controlling execution of multiple co-dependent transactions in an electronic data transaction processing system, the method comprising:

storing, by a processor separate from a plurality of hardware matching processors, in one or more data structures, data indicative of at least one other previously received but unsatisfied electronic data transaction request message, the one or more data structures stored in a first non-transitory memory associated with a plurality of data items coupled with the plurality of hardware matching processors, the plurality of hardware matching processors configured to receive incoming electronic request data transaction messages and to transact the plurality of data items associated therewith with the plurality of data items that match, as they are received, the incoming electronic data transaction request messages, for one of the plurality of data items based on a first set of transaction parameters, received over a data communication network with the at least one other previously received but unsatisfied electronic data transaction request message counter thereto stored in the one or more data structures, to at least partially satisfy one or both of the incoming electronic data transaction request messages or the at least one other previously received electronic data transaction request message, each particular hardware matching processor of the plurality of hardware matching processors coupled with and assigned to a particular data structure of the one or more data structures, each particular data structure associated with a different particular data item;

receiving, by the processor, a combined electronic data transaction request comprising a conditional execution instruction and a plurality of component electronic data transaction request messages, each for transaction of a different data item of the plurality of data items;

locking, by the processor, a subset of the one or more data structures, the subset of the one or more data structures associated with a particular data item related to at least one of the plurality of component electronic data transaction request messages to prevent modification, by other subsequently received incoming electronic data transaction request messages, of any of the at least one other previously received but unsatisfied electronic data transaction request message counter thereto stored in the one or more data structures stored in the first non-transitory memory associated with the plurality of data items, wherein the locking comprises sending, by the processor, an instruction to each particular hardware matching processor of the plurality of hardware matching processors coupled with each of the subset of the one or more data structures to prohibit modification of each particular data structure of the subset of the one or more data structures coupled therewith preventing each particular hardware matching processor coupled with each of the subset of the one or more data structures from processing subsequently received incoming electronic data transaction request messages from the data communications network;

validating, by the processor, instead of forwarding each of the plurality of component electronic data transaction request messages to the plurality of hardware matching processors, that each of the plurality of component electronic data transaction request messages may be matched with at least one other previously received but unsatisfied electronic data transaction request message counter thereto stored in the one or more data structures stored in the first non-transitory memory associated with the plurality of data items to satisfy the conditional execution instruction, wherein the validating further comprises forwarding, subsequent to the locking of the subset of the one or more data structures, by the processor, test messages representing the plurality of component electronic data transaction request messages to the respective plurality of hardware matching processors to determine if there is a test match, wherein the determination includes simultaneously checking the test messages, by the respective plurality of hardware matching processors, using parallel processing;

forwarding, by the processor, upon occurrence of the processor validating to satisfy the conditional execution instruction, each of the plurality of component electronic data transaction request messages to the plurality of hardware matching processors such that the forwarded plurality of component electronic data transaction request messages are all executed by the plurality of hardware matching processors before other subsequently received incoming electronic data transaction request messages, and rejecting, upon occurrence of a validation processor not validating to satisfy the conditional execution instruction, the combined electronic data transaction request; and unlocking, by the processor, the subset of the one or more data structures, only subsequent to the forwarding or rejecting, to allow modification of any of the at least one other previously received but unsatisfied electronic data transaction request message counter thereto stored in the subset of the one or more data structures associated with the plurality of data items, wherein the unlocking comprises sending, by the processor, an instruction to each particular hardware matching processor coupled with each of the subset of the one or more data structures to allow modification of the subset of the one or more data structures enabling each particular hardware matching processor coupled with each of the subset of the one or more data structures to process subsequently received incoming electronic data transaction request messages from the data communications network.

9. The method of claim 8, wherein the conditional execution instruction is satisfied if each of the plurality of component electronic data transaction request messages may be fully matched with at least one other previously received but unsatisfied electronic data transaction request message counter thereto stored in the one or more data structures stored in the first non-transitory memory associated with the plurality of data items.

10. The method of claim 8, further comprising:
receiving, by the processor, an electronic data transaction request representing a spread order; and
generating, by the processor, from the received spread order, the combined electronic data transaction request comprising the conditional execution instruction and the plurality of component electronic data transaction request messages, each for transaction of a different data item of the plurality of data items.

11. The method of claim 8, wherein the plurality of component electronic data transaction request messages include Fill or Kill instructions.

12. The method of claim 8, wherein the plurality of component electronic data transaction request messages are validated and forwarded in sequence.

13. The method of claim 8, wherein the plurality of component electronic data transaction request messages are validated and forwarded in parallel.

14. A system for controlling execution of multiple co-dependent transactions in an electronic data transaction processing system, the system comprising:

means for storing in one or more data structures, data indicative of at least one other previously received but unsatisfied electronic data transaction request message, the one or more data structures stored in a first non-transitory memory associated with a plurality of data items coupled with a plurality of hardware matching processors, the plurality of hardware matching processors configured to receive incoming electronic request data transaction messages and to transact a plurality of data items associated therewith with the plurality of data items that match, as they are received, the incoming electronic data transaction request messages, for one of the plurality of data items based on a first set of transaction parameters, received over a data communication network with the at least one other previously received but unsatisfied electronic data transaction request message counter thereto stored in the one or more data structures, to at least partially satisfy one or both of the incoming electronic data transaction request messages or the at least one other previously received electronic data transaction request message, each particular hardware matching processor of the plurality of hardware matching processors coupled with and assigned to a particular data structure of the one or more data structures, each particular data structure associated with a different particular data item;

means for receiving incoming electronic data transaction request messages and storing the received incoming electronic data transaction request messages in a buffer memory prior to forwarding the received incoming electronic data transaction request messages to the particular hardware matching processor for the particular data structure of the data item of the received incoming electronic data transaction request message;

means for receiving a combined electronic data transaction request comprising a conditional execution instruction and a plurality of component electronic data transaction request messages, each for transaction of a different data item of the plurality of data items, the conditional execution instruction defining how each of the plurality of component electronic data transaction request messages are to be processed by the system;

means for, instead of forwarding each of the plurality of component electronic data transaction request messages to the plurality of hardware matching processors, determining that each of the plurality of component electronic data transaction request messages may be matched with at least one other previously received but unsatisfied electronic data transaction request message counter thereto stored in the one or more data structures stored in the non-transitory memory to satisfy the conditional execution instruction, means for locking a subset of the one or more data structures, the subset of the one or more data structures associated with a particular data item related to at least one of the plurality of component electronic data transaction request messages to prevent modification, by other subsequently received incoming electronic data transaction request messages, of the stored previously received but unsatisfied electronic data transaction request messages while determining that the conditional execution instruction can be satisfied, wherein the locking of the subset of the one or more data structures comprises sending an instruction to each particular hardware matching processor of the plurality of hardware matching processors coupled with each of the subset of the one or more data structures to prohibit modification of each particular data structure of the subset of the one or more data structures coupled therewith preventing each particular hardware matching processor coupled with each of the subset of the one or more data structures from processing subsequently received incoming electronic data transaction request messages from the data communications network;

wherein the determining that each of the plurality of component electronic data transaction request messages may be matched further comprises forwarding, subsequent to the locking of the subset of the one or more data structures, test messages representing the plurality of component electronic data transaction request messages to the respective plurality of hardware matching processors to determine if there is a test match and checking the test messages, by the respective plurality of hardware matching processors, using parallel processing;

means for forwarding each of the plurality of component electronic data transaction request messages to the plurality of hardware matching processors upon the determination that the conditional execution instruction can be satisfied;

means for rejecting the combined electronic data transaction request upon the determination, that the conditional execution instruction cannot be satisfied; and means for unlocking the subset of the one or more data structures, only subsequent to the forwarding or rejecting, to allow modification of any of the at least one other previously received but unsatisfied electronic data transaction request message counter thereto stored in the subset of the one or more data structures stored in the non-transitory memory associated with the plurality of data items, wherein the unlocking of the subset of the one or more data structures comprises sending an instruction to each particular hardware matching processor coupled with each of the subset of the one or more data structures to allow modification of the subset of the one or more data structures enabling each particular hardware matching processor coupled with each of the subset of the one or more data structures to process subsequently received incoming electronic data transaction request messages from the data communications network.

15. The system of claim 14, wherein the conditional execution instruction is satisfied if each of the plurality of component electronic data transaction request messages may be fully matched with at least one other previously received but unsatisfied electronic data transaction request message counter thereto stored in the one or more data structures stored in the non-transitory memory associated with the plurality of data items.

16. The system of claim 14, wherein the plurality of component electronic data transaction request messages include Fill or Kill instructions.

* * * * *